US007925780B2

(12) United States Patent  
Philyaw

(10) Patent No.: US 7,925,780 B2  
(45) Date of Patent: *Apr. 12, 2011

(54) METHOD FOR CONNECTING A WIRELESS DEVICE TO A REMOTE LOCATION ON A NETWORK

(75) Inventor: Jeffry Jovan Philyaw, Dallas, TX (US)

(73) Assignee: RPX-LV Acquisition LLC, Wilmington, DE (US)

( * ) Notice: Subject to any disclaimer, the term of this patent is extended or adjusted under 35 U.S.C. 154(b) by 882 days.

This patent is subject to a terminal disclaimer.

(21) Appl. No.: 11/685,698

(22) Filed: Mar. 13, 2007

(65) Prior Publication Data

US 2007/0156918 A1    Jul. 5, 2007

Related U.S. Application Data

(63) Continuation of application No. 09/703,705, filed on Oct. 31, 2000, now Pat. No. 7,191,247, which is a continuation-in-part of application No. 09/378,221, filed on Aug. 19, 1999, now Pat. No. 6,745,234, which is a continuation-in-part of application No. 09/151,471, filed on Sep. 11, 1998, now abandoned, which is a continuation-in-part of application No. 09/151,530, filed on Sep. 11, 1998, now Pat. No. 6,098,106.

(51) Int. Cl.  
*G06F 15/16* (2006.01)

(52) U.S. Cl. ........................ 709/238; 709/250; 370/338

(58) Field of Classification Search .................. 709/237, 709/238, 250; 370/338  
See application file for complete search history.

(56) References Cited

U.S. PATENT DOCUMENTS

| | | | |
|---|---|---|---|
| 3,668,312 | A | 6/1972 | Yamamoto et al. |
| 3,886,328 | A | 5/1975 | Harms, Jr. et al. |
| 4,002,886 | A | 1/1977 | Sundelin |
| 4,042,792 | A | 8/1977 | Pakenham et al. |
| 4,365,148 | A | 12/1982 | Whitney |
| 4,471,218 | A | 9/1984 | Culp |

(Continued)

FOREIGN PATENT DOCUMENTS

CA        2250450        4/1999

(Continued)

OTHER PUBLICATIONS

"Group Decision Support System: Development and Application", Energy Systems, Westinghouse, Pittsburgh, PA.

(Continued)

*Primary Examiner* — Vivek Srivastava  
*Assistant Examiner* — Adnan Mirza  
(74) *Attorney, Agent, or Firm* — Howison & Arnott, L.L.P.

(57) ABSTRACT

A method for connecting a wireless device to a remote location on a computer network. A beacon signal is transmitted from a beacon unit to a beacon signal receiver circuit disposed with a wireless device. The beacon signal includes components indicative of a first code associated with a remote location and of a second code associated with an attribute of the beacon unit. A first message packet indicative of the first and second codes is transmitted to an intermediate location. A computer database including a plurality of routing information for remote locations on the computer network and a plurality of first codes is accessed. Routing information associated with the first code is retrieved, and a reply packet including the routing information is transmitted to the wireless device. A second message packet is transmitted from the wireless device to a remote location using the routing information.

20 Claims, 14 Drawing Sheets

U.S. PATENT DOCUMENTS

| | | | |
|---|---|---|---|
| 4,538,174 A | 8/1985 | Gargini et al. | |
| 4,546,352 A | 10/1985 | Goldman | |
| 4,581,484 A | 4/1986 | Bendig | |
| 4,621,259 A | 11/1986 | Schepers et al. | |
| 4,642,790 A | 2/1987 | Minshull et al. | |
| 4,654,482 A | 3/1987 | DeAngelis | |
| 4,672,377 A | 6/1987 | Murphy et al. | |
| 4,710,727 A | 12/1987 | Rutt | |
| 4,780,599 A | 10/1988 | Baus | |
| 4,783,648 A | 11/1988 | Homma et al. | |
| 4,785,296 A | 11/1988 | Tabata et al. | |
| 4,789,147 A | 12/1988 | Berger et al. | |
| 4,816,904 A | 3/1989 | McKenna et al. | |
| 4,817,136 A | 3/1989 | Rhoads | |
| 4,823,108 A | 4/1989 | Pope | |
| 4,823,303 A | 4/1989 | Terasawa | |
| 4,833,308 A | 5/1989 | Humble | |
| 4,841,132 A | 6/1989 | Kajitani et al. | |
| 4,845,634 A | 7/1989 | Vitek et al. | |
| 4,850,009 A | 7/1989 | Zook et al. | |
| 4,890,098 A | 12/1989 | Dawes et al. | |
| 4,893,333 A | 1/1990 | Baran et al. | |
| 4,894,789 A | 1/1990 | Yee | |
| 4,896,148 A | 1/1990 | Kurita | |
| 4,899,370 A | 2/1990 | Kameo et al. | |
| 4,901,073 A | 2/1990 | Kibrick | |
| 4,905,094 A | 2/1990 | Pocock et al. | |
| 4,907,264 A | 3/1990 | Seiler et al. | |
| 4,916,293 A | 4/1990 | Cartlidge et al. | |
| 4,937,853 A | 6/1990 | Brule et al. | |
| 4,947,028 A | 8/1990 | Gorog | |
| 4,959,530 A | 9/1990 | O'Connor | |
| 4,972,504 A | 11/1990 | Daniel et al. | |
| 4,975,948 A | 12/1990 | Andresen et al. | |
| 4,982,346 A | 1/1991 | Girouard et al. | |
| 4,983,817 A | 1/1991 | Dolash et al. | |
| 4,984,155 A | 1/1991 | Geier et al. | |
| 5,003,384 A | 3/1991 | Durden et al. | |
| 5,038,023 A | 8/1991 | Saliga | |
| 5,039,075 A | 8/1991 | Mayer | |
| 5,047,614 A | 9/1991 | Bianco | |
| 5,054,096 A | 10/1991 | Beizer | |
| 5,060,170 A | 10/1991 | Bourgeois et al. | |
| 5,088,045 A | 2/1992 | Shimanaka et al. | |
| 5,111,391 A | 5/1992 | Fields et al. | |
| 5,115,326 A | 5/1992 | Burgess et al. | |
| 5,128,752 A | 7/1992 | Von Kohorn | |
| 5,133,011 A | 7/1992 | McKiel, Jr. | |
| 5,144,654 A | 9/1992 | Kelley et al. | |
| 5,161,037 A | 11/1992 | Saito | |
| 5,161,214 A | 11/1992 | Addink et al. | |
| 5,175,422 A | 12/1992 | Koizumi et al. | |
| 5,179,700 A | 1/1993 | Aihara et al. | |
| 5,182,705 A | 1/1993 | Barr et al. | |
| 5,189,630 A | 2/1993 | Barstow et al. | |
| 5,191,525 A | 3/1993 | LeBrun et al. | |
| 5,198,644 A | 3/1993 | Pfeiffer et al. | |
| 5,213,337 A | 5/1993 | Sherman | |
| 5,227,771 A | 7/1993 | Kerr et al. | |
| 5,233,171 A | 8/1993 | Baldwin | |
| 5,235,654 A | 8/1993 | Anderson et al. | |
| 5,241,402 A | 8/1993 | Aboujaoude et al. | |
| 5,243,531 A | 9/1993 | DiPippo et al. | |
| 5,247,347 A | 9/1993 | Litteral et al. | |
| 5,249,044 A | 9/1993 | Von Kohorn | |
| 5,250,789 A | 10/1993 | Johnsen | |
| 5,262,860 A | 11/1993 | Fitzpatrick et al. | |
| 5,280,498 A | 1/1994 | Tymes et al. | |
| 5,285,278 A | 2/1994 | Holman | |
| 5,287,181 A | 2/1994 | Holman | |
| 5,288,976 A | 2/1994 | Citron et al. | |
| 5,296,688 A | 3/1994 | Hamilton et al. | |
| 5,304,786 A | 4/1994 | Pavlidis et al. | |
| 5,305,195 A | 4/1994 | Murphy | |
| 5,319,454 A | 6/1994 | Schutte | |
| 5,319,455 A | 6/1994 | Hoarty et al. | |
| 5,324,922 A | 6/1994 | Roberts | |
| 5,331,547 A | 7/1994 | Laszlo | |
| 5,340,966 A | 8/1994 | Morimoto | |
| 5,341,505 A | 8/1994 | Whitehouse | |
| 5,349,678 A | 9/1994 | Morris et al. | |
| 5,354,977 A | 10/1994 | Roustaei | |
| 5,355,146 A | 10/1994 | Chiu et al. | |
| 5,357,276 A | 10/1994 | Banker et al. | |
| 5,359,367 A | 10/1994 | Stockill | |
| 5,361,871 A | 11/1994 | Gupta et al. | |
| 5,362,948 A | 11/1994 | Morimoto | |
| 5,372,334 A | 12/1994 | Cuadros | |
| 5,377,323 A | 12/1994 | Vasudevan | |
| 5,382,779 A | 1/1995 | Gupta | |
| 5,382,948 A | 1/1995 | Gupta | |
| 5,386,298 A | 1/1995 | Bronnenberg et al. | |
| 5,398,336 A | 3/1995 | Tantry et al. | |
| 5,405,232 A | 4/1995 | Lloyd et al. | |
| 5,418,713 A | 5/1995 | Allen | |
| 5,420,403 A | 5/1995 | Allum et al. | |
| 5,420,943 A | 5/1995 | Mak | |
| 5,424,524 A | 6/1995 | Ruppert et al. | |
| 5,426,427 A | 6/1995 | Chinnock et al. | |
| 5,431,250 A | 7/1995 | Schlano | |
| 5,438,355 A | 8/1995 | Palmer | |
| 5,442,749 A | 8/1995 | Northcutt et al. | |
| 5,446,490 A | 8/1995 | Blahut et al. | |
| 5,446,919 A | 8/1995 | Wilkins | |
| 5,457,307 A | 10/1995 | Dumont | |
| 5,465,291 A | 11/1995 | Barrus et al. | |
| 5,483,052 A | 1/1996 | Smith et al. | |
| 5,483,640 A | 1/1996 | Isfeld et al. | |
| 5,491,495 A | 2/1996 | Ward et al. | |
| 5,491,508 A | 2/1996 | Friedell et al. | |
| 5,493,107 A | 2/1996 | Gupta et al. | |
| 5,507,009 A | 4/1996 | Grube et al. | |
| 5,519,878 A | 5/1996 | Dolin, Jr. | |
| 5,523,982 A | 6/1996 | Dale | |
| 5,530,852 A | 6/1996 | Meske, Jr. et al. | |
| 5,532,773 A | 7/1996 | Shaw et al. | |
| 5,548,110 A | 8/1996 | Storch et al. | |
| 5,563,630 A | 10/1996 | Tsakiris et al. | |
| 5,570,295 A | 10/1996 | Isenberg et al. | |
| 5,572,643 A | 11/1996 | Judson | |
| 5,578,818 A | 11/1996 | Kain et al. | |
| 5,579,124 A | 11/1996 | Aijala et al. | |
| 5,586,313 A | 12/1996 | Schnittket et al. | |
| 5,590,197 A | 12/1996 | Chen et al. | |
| 5,592,551 A | 1/1997 | Lett et al. | |
| 5,594,226 A | 1/1997 | Steger | |
| 5,595,264 A | 1/1997 | Trotta, Jr. | |
| 5,600,779 A | 2/1997 | Palmer et al. | |
| 5,602,377 A | 2/1997 | Beller et al. | |
| 5,604,542 A | 2/1997 | Dedrick | |
| 5,621,203 A | 4/1997 | Swartz et al. | |
| 5,633,484 A | 5/1997 | Zancho et al. | |
| 5,633,489 A | 5/1997 | Dvorkis et al. | |
| 5,636,346 A | 6/1997 | Saxe | |
| 5,640,002 A | 6/1997 | Ruppert et al. | |
| 5,640,193 A | 6/1997 | Wellner | |
| 5,646,390 A | 7/1997 | Wang et al. | |
| 5,649,186 A | 7/1997 | Ferguson | |
| 5,659,800 A | 8/1997 | Zhang et al. | |
| 5,664,110 A | 9/1997 | Green et al. | |
| 5,666,293 A | 9/1997 | Metz et al. | |
| 5,671,226 A | 9/1997 | Murakami et al. | |
| 5,671,282 A | 9/1997 | Wolff et al. | |
| 5,673,322 A | 9/1997 | Pepe et al. | |
| 5,675,721 A | 10/1997 | Freedman et al. | |
| 5,682,540 A | 10/1997 | Klotz, Jr. et al. | |
| 5,687,331 A | 11/1997 | Volk et al. | |
| 5,694,163 A | 12/1997 | Harrison | |
| 5,701,161 A | 12/1997 | Williams et al. | |
| 5,704,029 A | 12/1997 | Wright, Jr. | |
| 5,708,478 A | 1/1998 | Tognazzini | |
| 5,708,780 A | 1/1998 | Levergood et al. | |
| 5,710,887 A | 1/1998 | Chelliah et al. | |
| 5,715,314 A | 2/1998 | Payne et al. | |
| 5,721,848 A | 2/1998 | Joseph | |
| 5,724,424 A | 3/1998 | Gifford | |
| 5,726,898 A | 3/1998 | Jacobs | |

| | | | | | |
|---|---|---|---|---|---|
| 5,729,002 A | 3/1998 | Samples | 5,880,769 A | 3/1999 | Nemirofsky et al. |
| 5,732,218 A | 3/1998 | Bland et al. | 5,884,014 A | 3/1999 | Huttenlocher et al. |
| 5,734,413 A | 3/1998 | Lappington et al. | 5,886,634 A | 3/1999 | Muhme |
| 5,737,532 A | 4/1998 | DeLair et al. | 5,887,176 A | 3/1999 | Griffith et al. |
| 5,737,619 A | 4/1998 | Judson | 5,887,243 A | 3/1999 | Harvey et al. |
| 5,740,369 A | 4/1998 | Yokozawa et al. | 5,894,516 A | 4/1999 | Brandenburg |
| 5,742,825 A | 4/1998 | Mathur et al. | 5,903,225 A | 5/1999 | Schmitt et al. |
| 5,745,681 A | 4/1998 | Levine et al. | 5,903,721 A | 5/1999 | Sixtus |
| 5,746,602 A | 5/1998 | Kikinis | 5,905,248 A | 5/1999 | Russell et al. |
| 5,751,956 A | 5/1998 | Kirsch | 5,905,251 A | 5/1999 | Knowles |
| 5,754,906 A | 5/1998 | Yoshida | 5,905,521 A | 5/1999 | Gatto et al. |
| 5,754,981 A | 5/1998 | Veeneman et al. | 5,905,665 A | 5/1999 | Rim |
| 5,757,917 A | 5/1998 | Rose et al. | 5,905,865 A | 5/1999 | Palmer et al. |
| 5,758,257 A | 5/1998 | Herz et al. | 5,907,322 A | 5/1999 | Kelly et al. |
| 5,761,606 A | 6/1998 | Wolzien | 5,907,793 A | 5/1999 | Reams |
| 5,761,648 A | 6/1998 | Golden et al. | 5,912,454 A | 6/1999 | Castillo et al. |
| 5,764,906 A | 6/1998 | Edelstein et al. | 5,913,210 A | 6/1999 | Call |
| 5,765,176 A | 6/1998 | Bloomberg | 5,915,090 A | 6/1999 | Joseph et al. |
| 5,768,508 A | 6/1998 | Eikeland | 5,916,024 A | 6/1999 | Von Kohorn |
| 5,768,528 A | 6/1998 | Stumm | 5,917,725 A | 6/1999 | Thacher et al. |
| 5,768,539 A | 6/1998 | Metz et al. | 5,918,211 A | 6/1999 | Sloane |
| 5,768,583 A | 6/1998 | Orzol et al. | 5,918,213 A | 6/1999 | Bernard et al. |
| 5,774,170 A | 6/1998 | Hite et al. | 5,918,214 A | 6/1999 | Perkowski |
| 5,774,534 A | 6/1998 | Mayer | 5,923,735 A | 7/1999 | Swartz et al. |
| 5,774,660 A | 6/1998 | Brendel et al. | 5,923,806 A | 7/1999 | Sugawara |
| 5,774,664 A | 6/1998 | Hidary et al. | 5,925,865 A | 7/1999 | Steger |
| 5,774,666 A | 6/1998 | Portuesi | 5,929,849 A | 7/1999 | Kikinis |
| 5,774,870 A | 6/1998 | Storey | 5,929,850 A | 7/1999 | Broadwin et al. |
| 5,774,874 A | 6/1998 | Veeneman et al. | 5,930,767 A | 7/1999 | Reber et al. |
| 5,778,181 A | 7/1998 | Hidary et al. | 5,932,863 A | 8/1999 | Rathus et al. |
| 5,778,367 A | 7/1998 | Wesinger, Jr. et al. | 5,933,811 A | 8/1999 | Angles et al. |
| 5,785,246 A | 7/1998 | Lichtman et al. | 5,933,820 A | 8/1999 | Beier et al. |
| 5,786,585 A | 7/1998 | Eastman et al. | 5,933,829 A | 8/1999 | Durst et al. |
| 5,787,246 A | 7/1998 | Lichtman et al. | 5,935,004 A | 8/1999 | Tarr et al. |
| 5,790,793 A | 8/1998 | Higley | 5,937,163 A | 8/1999 | Lee et al. |
| 5,791,991 A | 8/1998 | Small | 5,938,726 A | 8/1999 | Reber et al. |
| 5,794,210 A | 8/1998 | Goldhaber et al. | 5,938,727 A | 8/1999 | Ikeda |
| 5,796,952 A | 8/1998 | Davis et al. | 5,940,073 A | 8/1999 | Klosterman et al. |
| 5,801,067 A | 9/1998 | Shaw et al. | 5,943,432 A | 8/1999 | Gilmore et al. |
| 5,804,803 A | 9/1998 | Cragun et al. | 5,944,791 A | 8/1999 | Scherpbier |
| 5,805,154 A | 9/1998 | Brown | 5,946,103 A | 8/1999 | Curry |
| 5,805,806 A | 9/1998 | McArthur | 5,947,746 A | 9/1999 | Tsai |
| 5,806,044 A | 9/1998 | Powell | 5,948,061 A | 9/1999 | Merriman et al. |
| 5,812,776 A | 9/1998 | Gifford | 5,950,173 A | 9/1999 | Perkowski |
| 5,815,776 A | 9/1998 | Nukada | 5,951,639 A | 9/1999 | MacInnis |
| 5,818,438 A | 10/1998 | Howe et al. | 5,956,699 A | 9/1999 | Wong et al. |
| 5,818,440 A | 10/1998 | Allibhoy et al. | 5,957,695 A | 9/1999 | Redford et al. |
| 5,818,441 A | 10/1998 | Throckmorton et al. | 5,959,275 A | 9/1999 | Hughes et al. |
| 5,818,935 A | 10/1998 | Maa | 5,960,411 A | 9/1999 | Hartman et al. |
| 5,822,436 A | 10/1998 | Rhoads | 5,961,603 A | 10/1999 | Kunkel et al. |
| 5,825,009 A | 10/1998 | Schmid et al. | 5,963,916 A | 10/1999 | Kaplan |
| 5,826,000 A | 10/1998 | Hamilton | 5,963,926 A | 10/1999 | Kumomura |
| 5,826,064 A | 10/1998 | Loring et al. | 5,970,469 A | 10/1999 | Scroggie et al. |
| 5,826,166 A | 10/1998 | Brooks et al. | 5,970,471 A | 10/1999 | Hill |
| 5,831,261 A | 11/1998 | Plesko | 5,970,472 A | 10/1999 | Allsop et al. |
| 5,832,223 A | 11/1998 | Hara et al. | 5,971,277 A | 10/1999 | Cragun et al. |
| 5,832,432 A | 11/1998 | Trader et al. | 5,973,684 A | 10/1999 | Brooks et al. |
| 5,832,449 A | 11/1998 | Cunningham | 5,974,443 A | 10/1999 | Jeske |
| 5,833,468 A | 11/1998 | Guy et al. | 5,974,451 A | 10/1999 | Simmons |
| 5,835,861 A | 11/1998 | Whiteside | 5,976,833 A | 11/1999 | Furukawa et al. |
| 5,835,911 A | 11/1998 | Nakagawa et al. | 5,978,773 A | 11/1999 | Hudetz et al. |
| 5,842,178 A | 11/1998 | Giovannoli | 5,979,757 A | 11/1999 | Tracy et al. |
| 5,848,202 A | 12/1998 | D'Eri et al. | 5,986,651 A | 11/1999 | Reber et al. |
| 5,848,292 A | 12/1998 | Nathan | 5,987,507 A | 11/1999 | Creedon et al. |
| 5,848,397 A | 12/1998 | Marsh et al. | 5,987,509 A | 11/1999 | Portuesi |
| 5,848,413 A | 12/1998 | Wolff | 5,991,601 A | 11/1999 | Anderson |
| 5,848,426 A | 12/1998 | Wang et al. | 5,991,739 A | 11/1999 | Cupps et al. |
| 5,850,187 A | 12/1998 | Carrender et al. | 5,991,749 A | 11/1999 | Morrill, Jr. |
| 5,854,897 A | 12/1998 | Radziewicz et al. | 5,992,744 A | 11/1999 | Smith et al. |
| 5,854,945 A | 12/1998 | Criscito et al. | 5,992,752 A | 11/1999 | Wilz, Sr. et al. |
| 5,862,452 A | 1/1999 | Cudak et al. | 5,995,105 A | 11/1999 | Reber et al. |
| 5,864,823 A | 1/1999 | Levitan | 5,995,965 A | 11/1999 | Experton |
| 5,867,730 A | 2/1999 | Leyda | 5,996,896 A | 12/1999 | Grabon |
| 5,869,819 A | 2/1999 | Knowles et al. | 5,999,996 A | 12/1999 | Dunn |
| 5,870,546 A | 2/1999 | Kirsch | 6,002,394 A | 12/1999 | Schein et al. |
| 5,872,588 A | 2/1999 | Aras et al. | 6,002,852 A | 12/1999 | Birdwell et al. |
| 5,874,722 A | 2/1999 | Rando et al. | 6,003,014 A | 12/1999 | Lee et al. |
| 5,875,327 A | 2/1999 | Brandt et al. | 6,003,073 A | 12/1999 | Solvason |
| 5,875,415 A | 2/1999 | Lieb et al. | 6,005,939 A | 12/1999 | Fortenberry et al. |

| | | | | | |
|---|---|---|---|---|---|
| 6,006,257 A | 12/1999 | Slezak | 6,163,803 A | 12/2000 | Watanabe |
| 6,009,274 A | 12/1999 | Fletcher et al. | 6,167,567 A | 12/2000 | Chiles et al. |
| 6,009,410 A | 12/1999 | LeMole et al. | 6,169,484 B1 | 1/2001 | Schuchman et al. |
| 6,009,465 A | 12/1999 | Decker et al. | 6,170,746 B1 | 1/2001 | Brook et al. |
| 6,012,038 A | 1/2000 | Powell | 6,177,860 B1 | 1/2001 | Cromer et al. |
| 6,012,045 A | 1/2000 | Barzilai et al. | 6,178,443 B1 | 1/2001 | Lin |
| 6,012,102 A | 1/2000 | Shachar | 6,181,351 B1 | 1/2001 | Merrill et al. |
| 6,014,090 A | 1/2000 | Rosen et al. | 6,185,542 B1 | 2/2001 | Moran et al. |
| 6,014,634 A | 1/2000 | Scroggie et al. | 6,185,589 B1 | 2/2001 | Votipka |
| 6,014,641 A | 1/2000 | Loeb et al. | 6,188,398 B1 | 2/2001 | Collins-Rector et al. |
| 6,014,701 A | 1/2000 | Chaddha | 6,189,050 B1 | 2/2001 | Sakarda |
| 6,015,167 A | 1/2000 | Savino et al. | 6,192,380 B1 | 2/2001 | Light et al. |
| 6,018,764 A | 1/2000 | Field et al. | 6,192,400 B1 | 2/2001 | Hanson et al. |
| 6,023,255 A | 2/2000 | Bell | 6,195,420 B1 | 2/2001 | Tognazzini |
| 6,024,641 A | 2/2000 | Sarno | 6,195,693 B1 | 2/2001 | Berry et al. |
| 6,026,376 A | 2/2000 | Kenney | 6,199,048 B1 | 3/2001 | Hudetz et al. |
| 6,029,045 A | 2/2000 | Picco et al. | 6,199,079 B1 | 3/2001 | Gupta et al. |
| 6,029,196 A | 2/2000 | Lenz | 6,202,054 B1 | 3/2001 | Lawlor et al. |
| 6,032,195 A | 2/2000 | Reber et al. | 6,202,062 B1 | 3/2001 | Cameron et al. |
| 6,037,928 A | 3/2000 | Nachinson et al. | 6,220,509 B1 | 4/2001 | Byford |
| 6,037,934 A | 3/2000 | Himmel et al. | 6,226,618 B1 | 5/2001 | Downs et al. |
| 6,038,366 A | 3/2000 | Ohno | 6,233,565 B1 | 5/2001 | Lewis et al. |
| 6,044,362 A | 3/2000 | Neely | 6,233,736 B1 | 5/2001 | Wolzien |
| 6,045,048 A | 4/2000 | Wilz et al. | 6,236,836 B1 | 5/2001 | Westman et al. |
| 6,049,539 A | 4/2000 | Lee et al. | 6,237,025 B1 | 5/2001 | Ludwig et al. |
| 6,049,870 A | 4/2000 | Greaves | 6,238,290 B1 | 5/2001 | Tarr et al. |
| 6,055,573 A | 4/2000 | Gardenswartz et al. | 6,240,448 B1 | 5/2001 | Imielinski et al. |
| 6,061,368 A | 5/2000 | Bendinelle et al. | 6,243,814 B1 | 6/2001 | Matena |
| 6,061,440 A | 5/2000 | Delaney et al. | 6,247,047 B1 | 6/2001 | Wolff |
| 6,061,646 A | 5/2000 | Martino et al. | 6,247,128 B1 | 6/2001 | Fisher et al. |
| 6,061,660 A | 5/2000 | Eggleston et al. | 6,249,810 B1 | 6/2001 | Kiraly |
| 6,061,719 A | 5/2000 | Bendinelli et al. | 6,251,016 B1 | 6/2001 | Tsuda et al. |
| 6,064,804 A | 5/2000 | Brink et al. | 6,251,017 B1 | 6/2001 | Leason et al. |
| 6,064,929 A | 5/2000 | Migues et al. | 6,256,498 B1 | 7/2001 | Ludwig |
| 6,064,979 A | 5/2000 | Perkowski | 6,256,732 B1 | 7/2001 | Cromer et al. |
| 6,067,526 A | 5/2000 | Powell | 6,260,023 B1 | 7/2001 | Seevers et al. |
| 6,070,147 A | 5/2000 | Harms et al. | 6,263,383 B1 | 7/2001 | Lee et al. |
| 6,070,160 A | 5/2000 | Geary | 6,278,717 B1 | 8/2001 | Arsenault et al. |
| 6,070,798 A | 6/2000 | Nethery | 6,279,830 B1 | 8/2001 | Ishibashi |
| 6,073,119 A | 6/2000 | Bornemisza-Wahr et al. | 6,282,522 B1 | 8/2001 | Davis et al. |
| 6,073,851 A | 6/2000 | Olmstead et al. | 6,282,713 B1 | 8/2001 | Kitsukawa et al. |
| 6,076,166 A | 6/2000 | Moshfeghi et al. | 6,290,131 B1 | 9/2001 | Kolis et al. |
| 6,076,733 A | 6/2000 | Wilz, Sr. et al. | 6,292,786 B1 | 9/2001 | Deaton et al. |
| 6,078,321 A | 6/2000 | Simonoff et al. | 6,297,727 B1 | 10/2001 | Nelson, Jr. |
| 6,081,629 A | 6/2000 | Browning | 6,297,819 B1 | 10/2001 | Furst |
| 6,084,523 A | 7/2000 | Gelnovatch et al. | 6,298,373 B1 | 10/2001 | Burns et al. |
| 6,085,146 A | 7/2000 | Kuribayashi et al. | 6,300,872 B1 | 10/2001 | Mathias et al. |
| 6,085,247 A | 7/2000 | Parsons, Jr. et al. | 6,301,012 B1 | 10/2001 | White et al. |
| 6,097,375 A | 8/2000 | Byford | 6,301,612 B1 | 10/2001 | Selitrennikoff et al. |
| 6,098,106 A | 8/2000 | Philyaw et al. | 6,308,893 B1 | 10/2001 | Waxelbaum et al. |
| 6,101,483 A | 8/2000 | Petrovich et al. | 6,311,165 B1 | 10/2001 | Coutts et al. |
| 6,104,845 A | 8/2000 | Lipman et al. | 6,311,185 B1 | 10/2001 | Markowitz et al. |
| 6,108,656 A | 8/2000 | Durst et al. | 6,311,214 B1 | 10/2001 | Rhoads |
| 6,108,706 A | 8/2000 | Birdwell et al. | 6,311,896 B1 | 11/2001 | Mulla et al. |
| 6,112,323 A | 8/2000 | Meizlik et al. | 6,314,451 B1 | 11/2001 | Landsman et al. |
| 6,112,981 A | 9/2000 | McCall | 6,314,456 B1 | 11/2001 | Van Andel et al. |
| 6,114,712 A | 9/2000 | Dvorkis et al. | 6,317,761 B1 | 11/2001 | Landsman et al. |
| 6,119,944 A | 9/2000 | Mulla et al. | 6,317,780 B1 | 11/2001 | Cohn et al. |
| 6,122,403 A | 9/2000 | Rhoads | 6,317,789 B1 | 11/2001 | Rakavy et al. |
| 6,122,740 A | 9/2000 | Andersen | 6,317,791 B1 | 11/2001 | Cohn et al. |
| 6,123,259 A | 9/2000 | Ogasawara | 6,317,885 B1 | 11/2001 | Fries |
| 6,123,263 A | 9/2000 | Feng | 6,321,991 B1 | 11/2001 | Knowles |
| 6,131,116 A | 10/2000 | Riggins et al. | 6,321,992 B1 | 11/2001 | Knowles et al. |
| 6,133,849 A | 10/2000 | McConnell et al. | 6,324,519 B1 | 11/2001 | Eldering |
| 6,134,532 A | 10/2000 | Lazarus et al. | 6,327,574 B1 | 12/2001 | Kramer et al. |
| 6,134,548 A | 10/2000 | Gottsman et al. | 6,328,213 B1 | 12/2001 | He et al. |
| 6,134,616 A | 10/2000 | Beatty | 6,330,543 B1 | 12/2001 | Kepecs |
| 6,138,036 A | 10/2000 | O'Cinneide | 6,330,593 B1 | 12/2001 | Roberts et al. |
| 6,138,155 A | 10/2000 | Davis et al. | 6,330,595 B1 | 12/2001 | Ullman et al. |
| 6,144,848 A | 11/2000 | Walsh et al. | 6,330,669 B1 | 12/2001 | McKeeth |
| 6,148,301 A | 11/2000 | Rosenthal | 6,330,715 B1 | 12/2001 | Razzaghe-Ashrafi |
| 6,148,331 A | 11/2000 | Parry | 6,331,972 B1 | 12/2001 | Harris et al. |
| 6,148,405 A | 11/2000 | Liao et al. | 6,334,113 B1 | 12/2001 | Walker et al. |
| 6,149,063 A | 11/2000 | Reynolds et al. | 6,336,152 B1 | 1/2002 | Richman et al. |
| 6,151,624 A | 11/2000 | Teare et al. | 6,337,717 B1 | 1/2002 | Nason et al. |
| 6,152,369 A | 11/2000 | Wilz, Sr. et al. | 6,338,094 B1 | 1/2002 | Scott et al. |
| 6,154,738 A | 11/2000 | Call | 6,343,276 B1 | 1/2002 | Barnett |
| 6,154,771 A | 11/2000 | Rangan et al. | 6,351,467 B1 | 2/2002 | Dillon |
| 6,161,132 A | 12/2000 | Roberts et al. | 6,351,640 B1 | 2/2002 | DeMont |

| | | |
|---|---|---|
| 6,353,898 B1 | 3/2002 | Wipfel et al. |
| 6,353,926 B1 | 3/2002 | Parthesarathy et al. |
| 6,353,929 B1 | 3/2002 | Houston |
| 6,356,876 B1 | 3/2002 | Lingham |
| 6,357,042 B2 | 3/2002 | Srinivasan et al. |
| 6,359,711 B1 | 3/2002 | Cole et al. |
| 6,368,177 B1 | 4/2002 | Gabai et al. |
| 6,374,237 B1 | 4/2002 | Reese |
| 6,374,402 B1 | 4/2002 | Schmeidler et al. |
| 6,377,690 B1 | 4/2002 | Witschorik |
| 6,377,930 B1 | 4/2002 | Chen et al. |
| 6,377,983 B1 | 4/2002 | Cohen et al. |
| 6,377,986 B1 | 4/2002 | Philyaw et al. |
| 6,381,632 B1 | 4/2002 | Lowell |
| 6,384,744 B1 | 5/2002 | Philyaw et al. |
| 6,386,454 B2 | 5/2002 | Hecht et al. |
| 6,389,409 B1 | 5/2002 | Horovitz et al. |
| 6,389,464 B1 | 5/2002 | Krishnamurthy et al. |
| 6,393,297 B1 | 5/2002 | Song |
| 6,394,354 B1 | 5/2002 | Wilz et al. |
| 6,398,106 B1 | 6/2002 | Ulvr et al. |
| 6,400,272 B1 | 6/2002 | Holtzman et al. |
| 6,400,407 B1 | 6/2002 | Zigmond et al. |
| 6,401,059 B1 | 6/2002 | Shen et al. |
| 6,401,077 B1 | 6/2002 | Godden et al. |
| 6,404,435 B1 | 6/2002 | Miller et al. |
| 6,405,049 B2 | 6/2002 | Herrod et al. |
| 6,412,699 B1 | 7/2002 | Russell et al. |
| 6,415,439 B1 | 7/2002 | Randell et al. |
| 6,415,983 B1 | 7/2002 | Ulvr et al. |
| 6,418,441 B1 | 7/2002 | Call |
| 6,418,555 B2 | 7/2002 | Mohammed |
| 6,421,445 B1 | 7/2002 | Jensen et al. |
| 6,421,732 B1 | 7/2002 | Alkhatib et al. |
| 6,424,249 B1 | 7/2002 | Houvener |
| 6,427,238 B1 | 7/2002 | Goodman et al. |
| 6,430,554 B1 | 8/2002 | Rothschild |
| 6,430,743 B1 | 8/2002 | Matsuura |
| 6,434,530 B1 | 8/2002 | Sloane et al. |
| 6,442,529 B1 | 8/2002 | Krishan et al. |
| 6,442,530 B1 | 8/2002 | Miller |
| 6,446,049 B1 | 9/2002 | Janning et al. |
| 6,446,119 B1 | 9/2002 | Olah et al. |
| 6,446,871 B1 | 9/2002 | Buckley et al. |
| 6,449,518 B1 | 9/2002 | Yokoo et al. |
| 6,459,439 B1 | 10/2002 | Ahlquist et al. |
| 6,460,093 B1 | 10/2002 | Taugher |
| 6,463,416 B1 | 10/2002 | Messina |
| 6,463,420 B1 | 10/2002 | Guidice et al. |
| 6,469,689 B1 | 10/2002 | Dow et al. |
| 6,484,022 B1 | 11/2002 | Findikli et al. |
| 6,484,149 B1 | 11/2002 | Jammes et al. |
| 6,484,198 B1 | 11/2002 | Milovanovic et al. |
| 6,487,538 B1 | 11/2002 | Gupta et al. |
| 6,487,719 B1 | 11/2002 | Itoh et al. |
| 6,490,601 B1 | 12/2002 | Markus et al. |
| 6,490,637 B1 | 12/2002 | Shih |
| 6,493,770 B1 | 12/2002 | Sartore et al. |
| 6,496,858 B1 | 12/2002 | Frailong et al. |
| 6,496,981 B1 | 12/2002 | Wistendahl et al. |
| 6,501,854 B1 | 12/2002 | Konishi et al. |
| 6,502,242 B1 | 12/2002 | Howe et al. |
| 6,504,626 B1 | 1/2003 | Shih |
| 6,510,997 B1 | 1/2003 | Wilz et al. |
| 6,512,522 B1 | 1/2003 | Miller et al. |
| 6,513,717 B2 | 2/2003 | Hannigan |
| 6,517,002 B1 | 2/2003 | Piatek |
| 6,519,463 B2 | 2/2003 | Tendler |
| 6,526,449 B1 | 2/2003 | Philyaw et al. |
| 6,536,666 B1 | 3/2003 | Hudrick |
| 6,536,670 B1 | 3/2003 | Postman et al. |
| 6,540,144 B1 | 4/2003 | Hudrick et al. |
| 6,542,874 B1 | 4/2003 | Walker et al. |
| 6,542,933 B1 | 4/2003 | Durst et al. |
| 6,542,943 B2 | 4/2003 | Cheng et al. |
| 6,543,052 B1 | 4/2003 | Ogasawara |
| 6,546,418 B2 | 4/2003 | Schena et al. |
| 6,560,640 B2 | 5/2003 | Smethers |
| 6,577,861 B2 | 6/2003 | Ogasawara |
| 6,577,877 B1 | 6/2003 | Charlier et al. |
| 6,580,870 B1 | 6/2003 | Kanazawa et al. |
| 6,581,838 B1 | 6/2003 | Meksavan et al. |
| 6,584,459 B1 | 6/2003 | Chang et al. |
| 6,587,835 B1 | 7/2003 | Treyz et al. |
| 6,591,247 B2 | 7/2003 | Stern |
| 6,594,705 B1 | 7/2003 | Philyaw |
| 6,595,859 B2 | 7/2003 | Lynn |
| 6,600,418 B2 | 7/2003 | Francis et al. |
| 6,600,496 B1 | 7/2003 | Wagner et al. |
| 6,600,725 B1 | 7/2003 | Roy |
| 6,601,172 B1 | 7/2003 | Epstein |
| 6,604,242 B1 | 8/2003 | Weinstein et al. |
| 6,604,681 B1 | 8/2003 | Burke et al. |
| 6,612,495 B2 | 9/2003 | Reddersen et al. |
| 6,615,268 B1 | 9/2003 | Philyaw et al. |
| 6,616,056 B2 | 9/2003 | Cato |
| 6,622,165 B1 | 9/2003 | Philyaw |
| 6,625,581 B1 | 9/2003 | Perkowski |
| 6,636,896 B1 | 10/2003 | Philyaw |
| 6,637,028 B1 | 10/2003 | Voyticky et al. |
| 6,645,068 B1 | 11/2003 | Kelly et al. |
| 6,661,904 B1 | 12/2003 | Sasich et al. |
| 6,665,836 B1 | 12/2003 | Wynblatt et al. |
| 6,668,133 B2 | 12/2003 | Yuen et al. |
| 6,668,293 B2 | 12/2003 | Chen et al. |
| 6,678,866 B1 | 1/2004 | Sugimoto et al. |
| 6,686,910 B2 | 2/2004 | O'Donnell, Jr. |
| 6,688,522 B1 | 2/2004 | Philyaw et al. |
| 6,697,949 B1 | 2/2004 | Philyaw et al. |
| 6,701,354 B1 | 3/2004 | Philyaw et al. |
| 6,701,524 B1 | 3/2004 | Okamura et al. |
| 6,704,864 B1 | 3/2004 | Philyaw |
| 6,708,208 B1 | 3/2004 | Philyaw |
| 6,725,260 B1 | 4/2004 | Philyaw |
| 6,725,461 B1 | 4/2004 | Dougherty et al. |
| 6,738,978 B1 | 5/2004 | Hendricks et al. |
| 6,741,574 B2 | 5/2004 | Arsenault |
| 6,745,234 B1 | 6/2004 | Philyaw et al. |
| 6,748,278 B1 | 6/2004 | Maymudes |
| 6,753,883 B2 | 6/2004 | Schena et al. |
| 6,758,398 B1 | 7/2004 | Philyaw et al. |
| 6,778,096 B1 | 8/2004 | Ward et al. |
| 6,779,178 B1 | 8/2004 | Lloyd et al. |
| 6,785,659 B1 | 8/2004 | Landsman et al. |
| 6,791,588 B1 | 9/2004 | Gifford |
| 6,792,452 B1 | 9/2004 | Philyaw |
| 6,792,618 B1 | 9/2004 | Bendinelli et al. |
| 6,806,808 B1 | 10/2004 | Watters et al. |
| 6,813,608 B1 | 11/2004 | Baranowski |
| 6,813,776 B2 | 11/2004 | Chernock et al. |
| 6,816,894 B1 | 11/2004 | Philyaw et al. |
| 6,823,366 B1 | 11/2004 | Nakano |
| 6,826,775 B1 | 11/2004 | Howe et al. |
| 6,829,646 B1 | 12/2004 | Philyaw et al. |
| 6,829,650 B1 | 12/2004 | Philyaw et al. |
| 6,832,729 B1 | 12/2004 | Perry et al. |
| 6,836,799 B1 | 12/2004 | Philyaw et al. |
| 6,843,417 B1 | 1/2005 | Philyaw et al. |
| 6,845,388 B1 | 1/2005 | Philyaw |
| 6,857,131 B1 | 2/2005 | Yagawa et al. |
| 6,859,699 B2 | 2/2005 | Carroll et al. |
| 6,877,032 B1 | 4/2005 | Philyaw |
| 6,886,013 B1 | 4/2005 | Beranek |
| 6,886,178 B1 | 4/2005 | Mao et al. |
| 6,892,226 B1 | 5/2005 | Tso et al. |
| 6,909,183 B2 | 6/2005 | Borgstahl et al. |
| 6,961,555 B1 | 11/2005 | Philyaw |
| 6,961,712 B1 | 11/2005 | Perkowski |
| 6,970,916 B1 | 11/2005 | Philyaw |
| 6,988,248 B1 | 1/2006 | Tang et al. |
| 6,990,680 B1 | 1/2006 | Wugofski |
| 7,069,582 B2 | 6/2006 | Philyaw et al. |
| 7,110,981 B1 | 9/2006 | Sidikman et al. |
| 7,159,037 B1 | 1/2007 | Philyaw et al. |
| 7,200,865 B1 | 4/2007 | Roscoe et al. |
| 7,272,155 B2 | 9/2007 | Kenney et al. |

FOREIGN PATENT DOCUMENTS

| | | |
|---|---|---|
| DE | 0 601 437 A1 | 6/1994 |
| DE | 19951881 | 5/2001 |
| EP | 0 152 341 A1 | 8/1985 |
| EP | 0399200 A2 | 4/1990 |
| EP | 0569311 | 10/1993 |
| EP | 0 837 406 A1 | 4/1998 |
| EP | 0837406 | 4/1998 |
| EP | 0905984 A2 | 9/1998 |
| EP | 0921481 | 11/1998 |
| EP | 0889413 | 7/1999 |
| EP | 0927945 A2 | 7/1999 |
| EP | 0 961 250 A2 | 12/1999 |
| FR | 0 692 613 A1 | 9/1994 |
| GB | 2 307 628 A | 5/1997 |
| JP | 63276672 A | 11/1988 |
| JP | 10188140A A1 | 12/1996 |
| JP | 11154131 | 6/1999 |
| NL | 1016278 | 3/2002 |
| WO | WO 91/03891 | 3/1991 |
| WO | WO 93/14476 | 7/1993 |
| WO | 9510813 A1 | 10/1994 |
| WO | 9607146 A1 | 9/1995 |
| WO | WO 95/28044 | 10/1995 |
| WO | 9701137 A | 1/1997 |
| WO | WO 97/02074 | 1/1997 |
| WO | 9737319 A1 | 2/1997 |
| WO | WO 97/26061 | 6/1997 |
| WO | 9809243 A1 | 8/1997 |
| WO | WO 98/08243 | 8/1997 |
| WO | WO 97/33434 A1 | 9/1997 |
| WO | 9803923 A1 | 1/1998 |
| WO | 9806055 A1 | 2/1998 |
| WO | 9819259 A1 | 5/1998 |
| WO | 9826548 A1 | 6/1998 |
| WO | 9838761 A1 | 9/1998 |
| WO | 9840823 A1 | 9/1998 |
| WO | 9841020 A1 | 9/1998 |
| WO | 9849813 A1 | 11/1998 |
| WO | 9853611 A1 | 11/1998 |
| WO | 9857490 A1 | 12/1998 |
| WO | 9900979 A1 | 1/1999 |
| WO | 9915968 A1 | 4/1999 |
| WO | 9921109 A1 | 4/1999 |
| WO | 9963457 A1 | 6/1999 |
| WO | 9938321 A1 | 7/1999 |
| WO | WO 00/09229 | 2/2000 |
| WO | WO 00/16205 | 3/2000 |
| WO | WO 00/54182 A1 | 9/2000 |
| WO | WO 00/56072 | 9/2000 |

OTHER PUBLICATIONS

"New Technologies in Credit Card Authentication", Pieter de Bryne, Institute for Communications Technology, Zurich, Switzerland.
"Avital, a Private Teaching System by Fax Communication", Atsusji Iizawa, Noriro Sugiki, Yukari Shitora and Hideko Kunii, Software Research Center, Tokyo, Japan.
"Document on Computer" USPS Technical Support Center, Norman, OK.
"Development of a Commercially Successful Wearable Data Collection System", Symbol Technologies, Inc.
What do forward looking companies consider in their plans and developments?, A.G. Johnston, Nestle.
"The Automation Synergy", Neves and Noivo, Portugal.
"Integration of Hand-Written Address Interpretation Technology into the United States Postal Service Remote Computer Reader System", Srihari (Cedar, Suny at Buffalo) and Kueberg (U.S. Postal Service, VA).
"Paper Based Document Security—A Review", van Renesse, TNO Institute of Applied Physics, The Netherlands.
"IEEE Standard for Bar Coding for Distribution Transformers" Transformers Committee of the IEEE Power Engineering Society, The Institute of Electrical and Electronics Engineers, Inc. NY.
"The Stylus™-Shopping from Home", Stylus Innovation, MA.
"Distributing Uniform Resource Locators as Bar Code Images", IBM Technical Disclosure Bulleting, Jan. 1996.
"Bar Code Method for Automating Catalog Orders", IBM Technical Disclosure Bulletin, Sep. 1998.
"Bar-Code Recognition System Using Image Processing", Kuroki, Yoneoka et al., Hitachi Research Laboratory.
"Ubiquitous Advertising on the WWW: Merging Advertisement on the Browser," Kohda Y et al; Computer Networks and ISDN Systems, May 1, 1996, pp. 1493-1499, vol. 28, No. 11, North Holland Publishing, Amsterdam, NL.
"Integrating Traditional Media with the Web", web page located at www.webchoicetv.com/products, 4 pages, by WebChoice, Inc., Santa Monica, CA.
"Web page for Symbol," located at www.symbol.com, 5 pages.
"Symbol CyberPen (previously known as InfoPen)", web page located at www.symbol.com/products/consumersystembs/consumercyberpen, 2 pages.
White, James J. and Summers, Robert S. Uniform Commercial Code. 4th Ed. West Publishing Co., St. Paul MN, 1995.
Postel, J., Ed., A Memo from the Internet Architecture Board entitled, "Internet Official Protocol Standards." <ftp://ftp.rfc-editor.org/in-notes/rfc2000.txt.> Feb. 1997.
Yesil, Magdalena, "Creating the Virtual Store: taking your web site from browsing to buying ", John Wiley & Sons, Inc.; New York, 1997, pp. 52-55, under the heads, "Using the Virtual Store to Generate Revenue", "Advertising Revenue", "Revenue Based on Sales".
U.P.C. Symbol Specification Manual, Uniform Code Council, Inc., Mar. 4, 1996.
"Bell Atlantic Introduces Home Management Services in Washington Area" PR Newswire Jan. 9, 1993.
The Bank Credit Card Business. 2nd Edition. American Bankers Association, 1996.
Taylor, Bernard W., III, Introduction to Management Science, 5th Ed., Prentice-Hall Inc., NJ, 1996.
"Inexpensive set-top boxes unleash Internet TV", Japan Times (XAO) Sep. 10, 1998 p. 8 , dialog file 583, # 06689158.
T. Berners-Lee et al., "Hypertext Transfer Protocol—HTTP/1.0", May 1996, Network Working Group, RFC1945, section 10.11.
"It's not interactive TV, but it's close enough" by Carl, Jeremy, WebWeek, Dec. 1, 1995, vol. 1, No. 8, p. 39, Dialog File 233, #00405621.
"Motorola i1000 cellular barcode scanner", Scan and go provides mobile computing solutions. Cellular barcode scanners, attached to cellular phones or wireless PDA's; retrieved from the Internet on Apr. 23, 2005.
"Newspaper Subscribers Use Symbol Bar-Code Pen Scanner to Capture Web Site Addresses Directly From Print Media" Business Wire. Dec. 21, 1998.
"PBS to transmit Web pages via TV signals -Web pages catch a ride on TV broadcasts" by Andrews, Whit, WebWeek, Apr. 2, 1997, v3 n12 p27, Dialog File 233, #00456769.
Restatement of the Law, Second, Contracts 2d, §§I-385 8 their Comments, American Law Institute, St. Paul MN, 1981.
PCT Written Opinion; International Application No. PCT/US00/22037; Dec. 5, 2001; 5 pages.
PCT Notification of Transmittal of International Preliminary Examination Report; International Application No. PCT/US00/21494; Dec. 21, 2001; 7 pages.
Adams, Russ, "Test Drive the symbol SPT 1500". Automatic I.D. News; Cleveland; Jan. 1999, vol. 15, Issue: 1, extracted from http://proquestumi.com/pqd on Aug. 2, 2002.
PCT International Search Report; International Application No. PCT/US00/22037; Jan. 29, 2001; 4 pages.
Bragg, Steven M., Accounting Best Practices, John Wiley and Sons, Inc., 1999.
Curtis, S.P.; "Transponder technologies, applications and benefits" Use of Electronic Transponders in Automation, IEEE Colloquium on, Feb. 15, 1989 pp. 2/1-218.
PacTel jumps back into electronic directory business with At Hand (Pacific Telesis's Web-based directory of advertising,business listing and advertising), Electronic Marketplace Report, v10, p3(1). Jul. 1996.
Defter, Frank J. et. al. How Networks Work, Millennium Ed., Que Corporation, Nov. 2000.

Edwards, W. Keith et al. "Systematic Output Modification in a 2D User Interface Toolkit," Proceedings of the 10th ACM Symposium on User Interface Software and Technology (UIST '97) Oct. 14-17, 1997, pp. 1-8.

Gavan, J.; "Transponders for the detection and identification of remote cooperative targets" Telesystems Conference, 1994. Conference Proceedings., 1994 IEEE National, May 26-28, 1994 pp. 229-232.

Going Beyond the Banner by Cathy Taylor from Brandweek, v XXXVII, n28, IQ22+, dated Jul. 8, 1996.

Gooding, Mike, "Handheld Precision Test Data Collector", Autotestcon 97, 1997 IEEE Autotestcon Proceedings, pp. 323-326, Sep. 22-25, 1997, Anaheim, CA, USA, extracted from Internet on Aug. 2, 2002.

Gralla, Preston, How the Internet Works, Millennium Ed., Que Corporation, Aug. 8, 1999.

Ollivier, M.M.; "RFID—a practical solution for problems you didn't even know you had!" Wireless Technology (Digest No. 1996/199), IEE Colloquium on, Nov. 14, 1996 pp. 311-316.

Muller, Nathan J., Desktop Encyclopedia of the Internet, Artech House, Inc., 1998.

White, Ron, How Computers Work, Millennium Ed. Que Corporation; Sep. 1999.

Morrison, Tina-marie, Visa sets up website to encourage online buyers, Dominion, New Zealand, dated Aug. 24, 2000.

Joyce, John, Steganography?; vol. 19, Issue 8, p. 12, Jul. 2002.

Keyes, Jessica, Handbook of Technology in Financial Serivces 1999, CRC Press, LLC, 1999.

Adams, Russ, "Test Drive the symbol SPT 1500." Automatic I.D. News; Cleveland; Jan. 1999, vol. 15, Issue: 1, extracted from http://proquest.umi.com/pqd on Aug. 2, 2002.

PATH A: SOURCE TO ARS

400 — | URL OF ARS | ADVERTISER PRODUCT CODE | URL OF SOURCE |

FIG. 4a

PATH B: ARS TO SOURCE

402 — | URL OF SOURCE | URL OF ADVERTISER | URL OF ARS |

FIG. 4b

PATH C: SOURCE TO ADVERTISER

404 — | URL OF ADVERTISER | REQUEST-FOR-INFORMATION | URL OF SOURCE |

FIG. 4c

PATH D: ADVERTISER TO SOURCE

406 — | URL OF SOURCE | REQUESTED INFORMATION | URL OF ADVERTISER |

FIG. 4d

PATH E: ARS TO ADVERTISER (OPTIONAL)

408 — | URL OF ADVERTISER | REQUEST-FOR-INFORMATION | URL OF SOURCE |

FIG. 4e

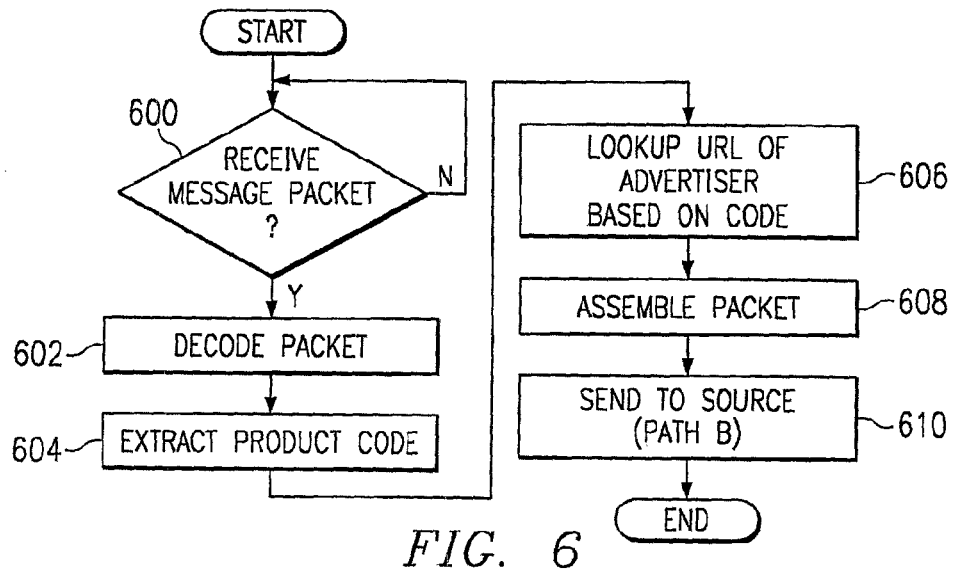

FIG. 6

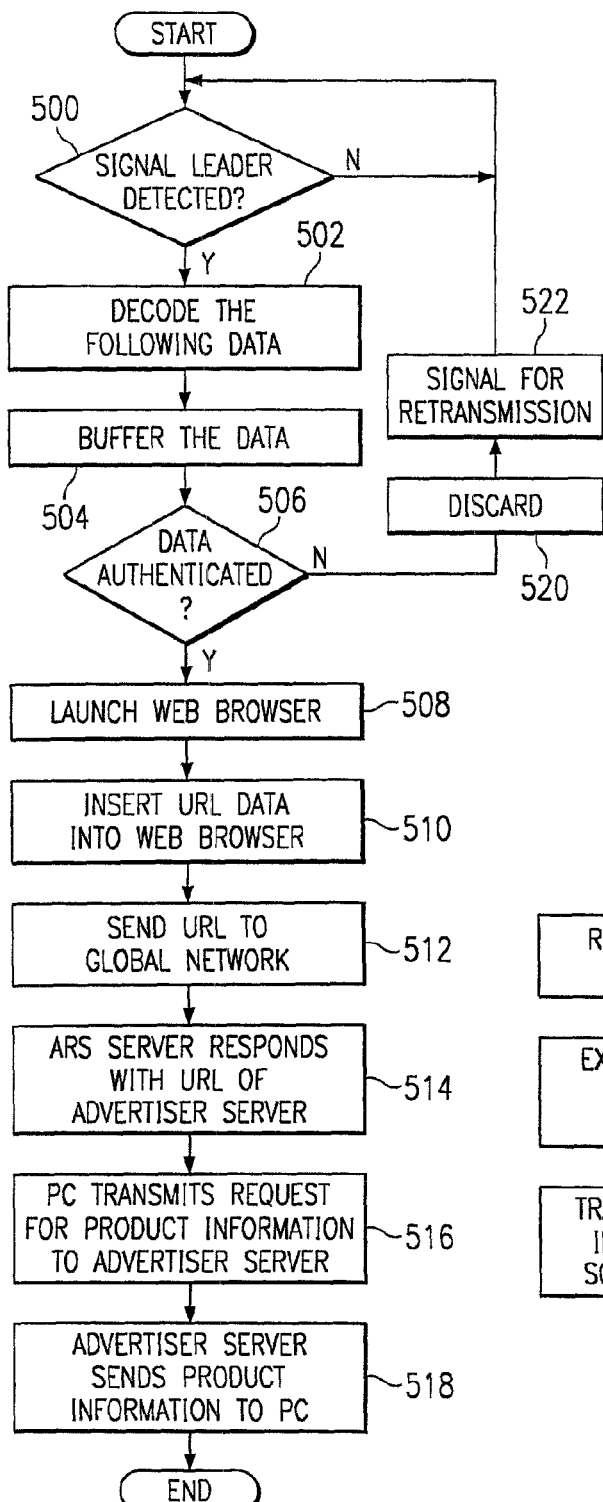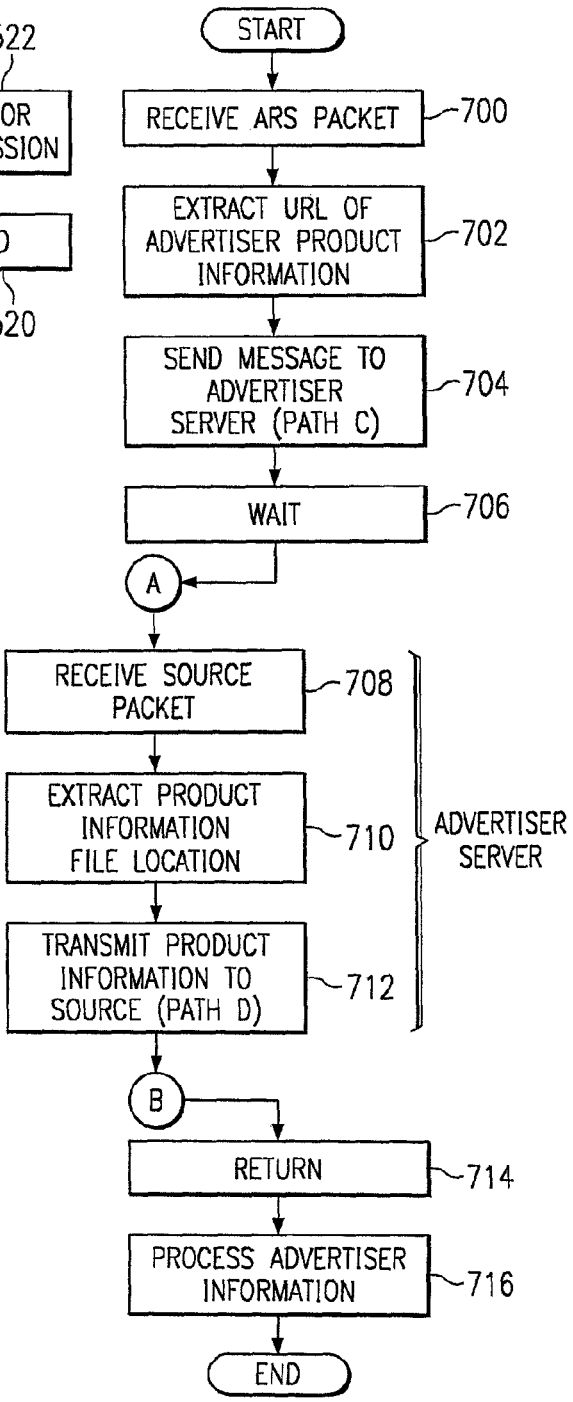

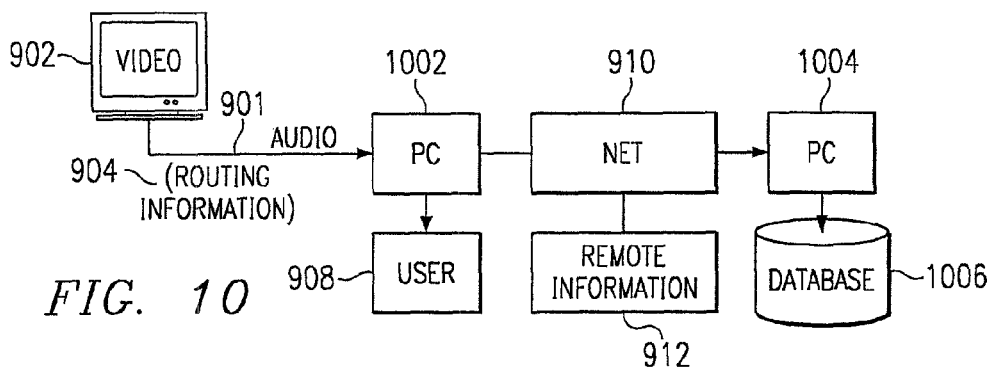
FIG. 10
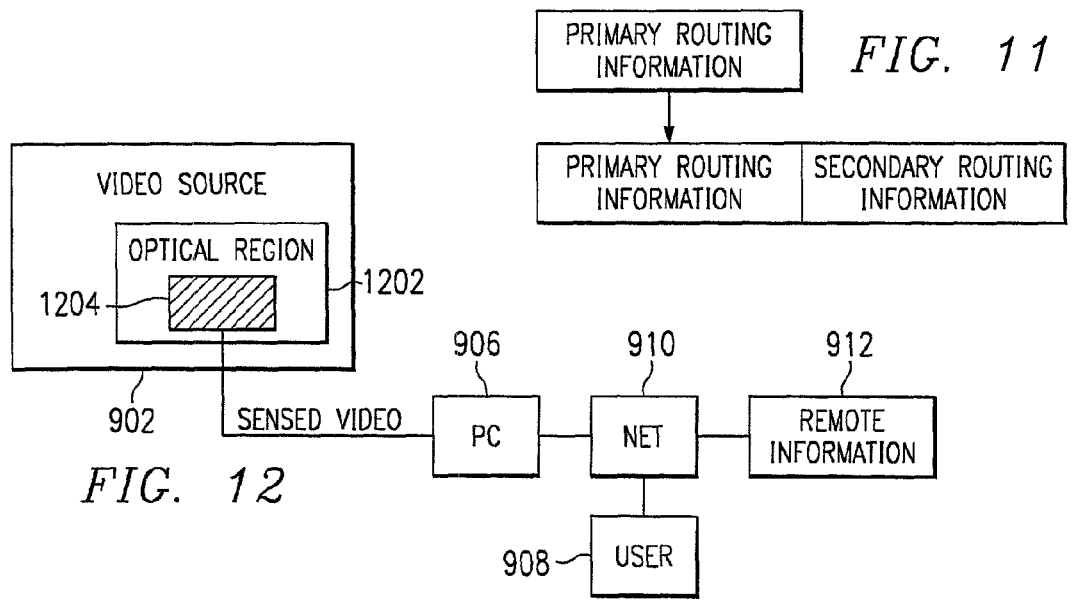
FIG. 11
FIG. 12
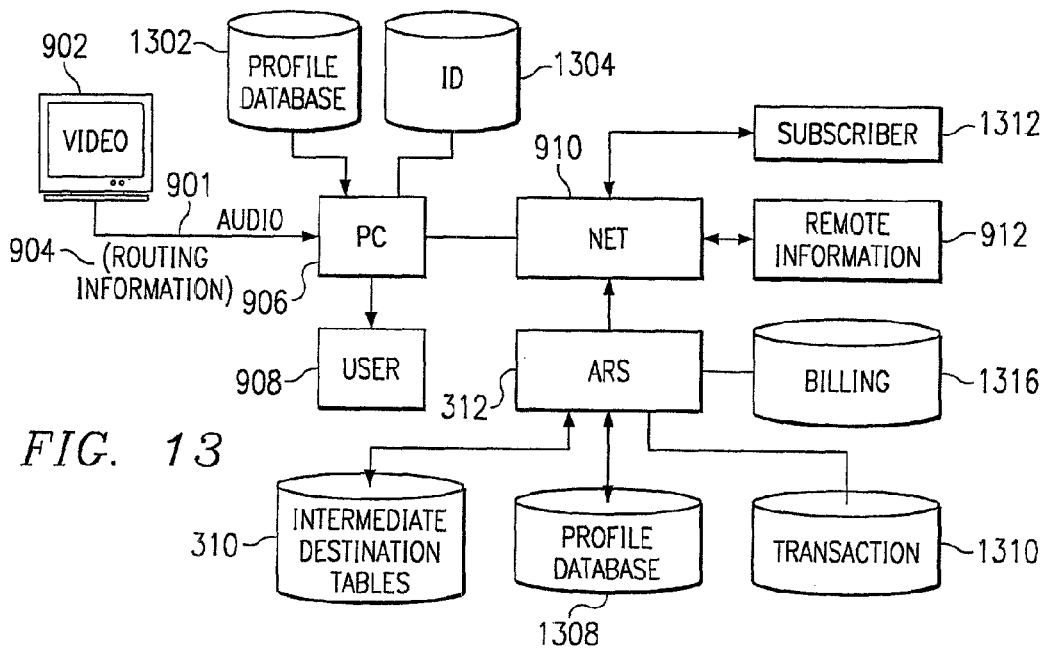
FIG. 13

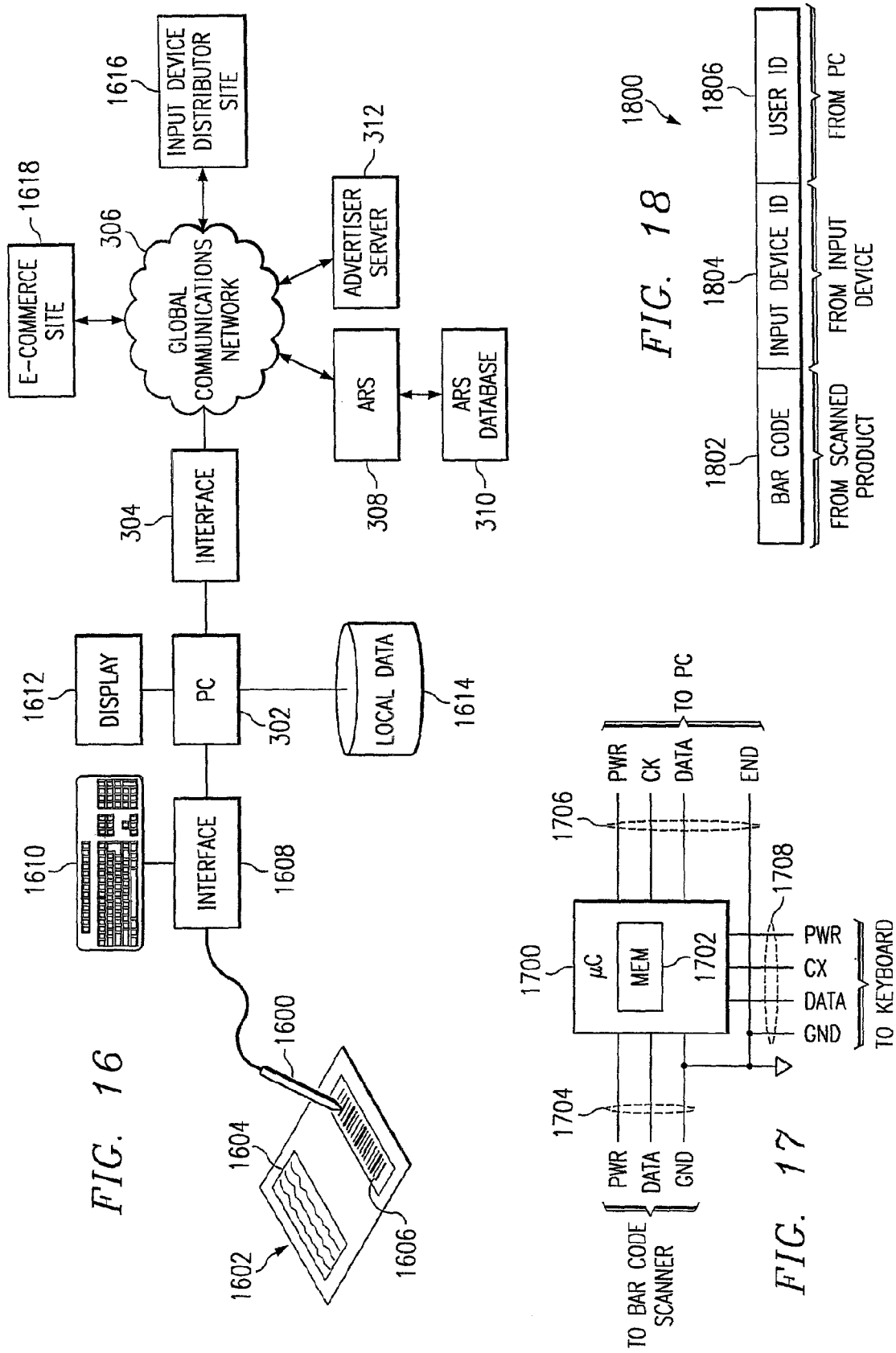

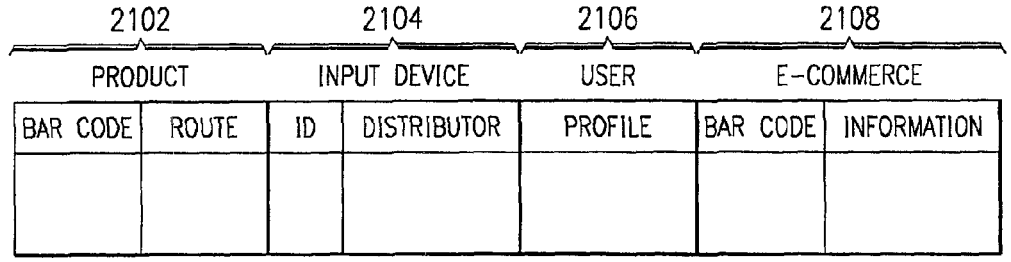
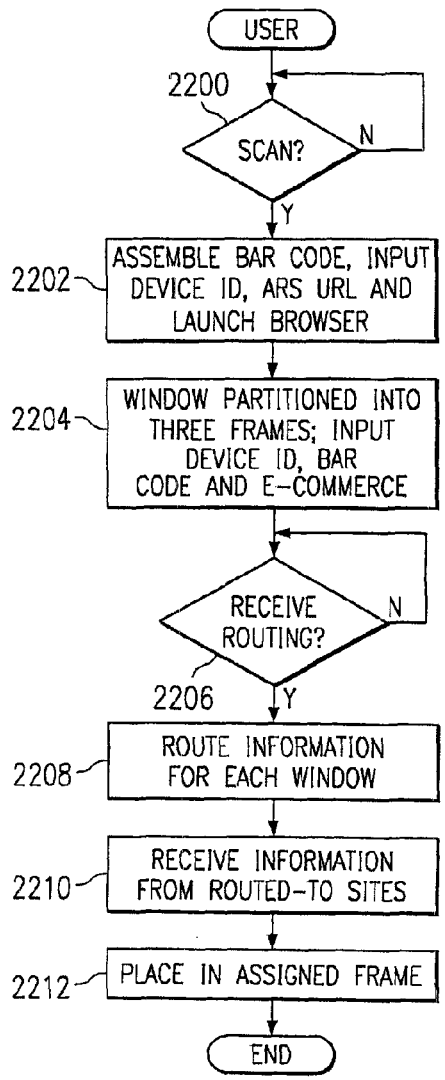
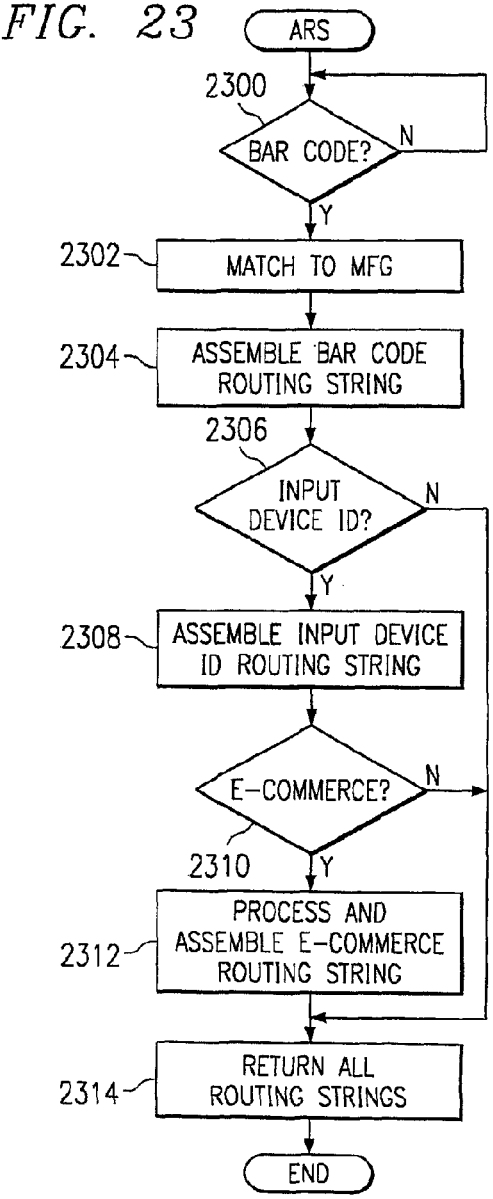

US 7,925,780 B2

METHOD FOR CONNECTING A WIRELESS DEVICE TO A REMOTE LOCATION ON A NETWORK

CROSS REFERENCE TO RELATED APPLICATION

This application is a Continuation of U.S. patent application Ser. No. 09/703,705 entitled "METHOD FOR CONNECTING A WIRELESS DEVICE TO A REMOTE LOCATION ON A NETWORK" filed on Oct. 31, 2000, and issued as U.S. Pat. No. 7,191,247 on Mar. 13, 2007. Ser. No. 09/703,705 is a Continuation-in-Part of U.S. patent application Ser. No. 09/378,221 entitled "METHOD AND APPARATUS FOR ACCESSING A REMOTE LOCATION BY SCANNING AN OPTICAL CODE" filed on Aug. 19, 1999, and issued as U.S. Pat. No. 6,745,234 on Jun. 1, 2004. Ser. No. 09/378,221 is a Continuation-in-Part of U.S. patent application Ser. No. 09/151,471 entitled "METHOD FOR INTERFACING SCANNED PRODUCT INFORMATION WITH A SOURCE FOR THE PRODUCT OVER A GLOBAL NETWORK" filed on Sep. 11, 1998, now abandoned. Ser. No. 09/378,221 is also a Continuation-in-Part of U.S. patent application Ser. No. 09/151,530 entitled "METHOD FOR CONTROLLING A COMPUTER WITH AN AUDIO SIGNAL" filed on Sep. 11, 1998, and issued as U.S. Pat. No. 6,098,106 on Aug. 1, 2000. The present application is related to U.S. patent application Ser. No. 09/703,465 entitled "SYSTEM AND APPARATUS FOR CONNECTING A WIRELESS DEVICE TO A REMOTE LOCATION ON A NETWORK" filed on Oct. 31, 2000, and issued as U.S. Pat. No. 6,961,555 on Nov. 1, 2005.

TECHNICAL FIELD OF THE INVENTION

This invention is related to an apparatus for computer control. In one aspect, it relates to an apparatus for automatically connecting a nearby wireless device to a remote location on a computer network.

BACKGROUND OF THE INVENTION

Global communication networks such as the Internet provide businesses with a new infrastructure for reaching millions of potential customers. So-called "web pages" have become a major vehicle for providing information content (e.g., advertising) to users, and a convenient method for distributing information the users from remote locations on the network.

The emergence of e-commerce over the Internet, and the resulting scramble to capture the attention of users now demands more effective ways for vendors to direct their advertising to potential customers. Such efforts are complicated by the development of so-called wireless devices, e.g., mobile computers and other digital computing devices which are connected to the Internet by means of a radio frequency interface. These wireless devices are frequently employed while the user is actually moving, e.g., walking or traveling in an automobile, train, airplane, etc. Thus, new methods and apparatus are needed to facilitate connection of wireless devices to desired locations on the Internet.

It is known to connect a wireless device to a remote location on a network by manually inputting a network address. However, in many cases the address of a remote location is unknown or unavailable to the user. In other cases, the network address is available (e.g., displayed in advertising), but it is cumbersome or even unsafe (e.g., while driving a car) for the user to enter the desired address using the tiny buttons or stylus often associated with a wireless device. A need therefore exists, for a system for connecting a wireless device to a remote location on a network which does not require the user to manually input a network address.

In many cases, an advertiser desires to provide the user of a wireless device with information or knowledge which is especially relevant to the user's current geographic location, e.g., nearby restaurants or shopping opportunities. Further, unless the user of a wireless device has a GPS or other positioning system available, the user typically does not know precisely what his or her current geographic location is. A need therefore exists, for a system for connecting a wireless device to a remote location on a network which is associated with the current geographic location of the wireless device, without requiring the wireless device or its user to provide any geographic location information.

SUMMARY OF THE INVENTION

The present invention disclosed and claimed herein comprises, in one aspect thereof, a method for connecting a wireless device to a remote location on a computer network. A beacon signal is transmitted from a beacon unit disposed at a first geographic location. The beacon signal includes components indicative of a first code and of a second code, the first code being associated with a remote location on a computer network and the second code being associated with an attribute of the beacon unit. The beacon signal is received using a beacon signal receiver circuit disposed with a wireless device at a second geographic location. The first code and the second code are then extracted from the beacon signal. In response to receiving the beacon signal, control signals indicative of the first code and the second code are sent from the beacon signal receiver circuit to the wireless device. In response to receiving the control signals, an RF signal constituting a first message packet is transmitted from the wireless device to an intermediate location on the computer network. The first message packet is indicative of the first code and the second code. The first message packet is received at the intermediate location and the first code and the second code are extracted therefrom. A computer database is accessed from the intermediate location. The database includes a plurality of routing information for remote locations on the computer network and a plurality of first codes. Each of the routing information is associated with at least one of the first codes. The routing information associated with the first code received in the beacon signal is then retrieved, and a reply packet including the routing information is transmitted from the intermediate location across the computer network back to the wireless device. In response to receiving the reply packet, a second message packet is transmitted from the wireless device to a remote location on the network using the routing information just received, thereby connecting the wireless device to the associated remote location.

BRIEF DESCRIPTION OF THE DRAWINGS

For a more complete understanding of the present invention and the advantages thereof, reference is now made to the following description taken in conjunction with the accompanying Drawings in which:

FIGS. 4a-4e illustrate the various message packets transmitted between the source PC and network servers used in the preferred embodiment;

FIG. 5 is a flowchart depicting operation of the system according to the preferred embodiment;

FIG. 6 illustrates a flowchart of actions taken by the Advertiser Reference Server ("ARS") server;

FIG. 7 illustrates a flowchart of the interactive process between the source computer and ARS;

FIG. 10 illustrates a more detailed, simplified block diagram of the embodiment of FIG. 9;

FIG. 11 illustrates a diagrammatic view of a method for performing the routing operation;

FIG. 12 illustrates a block diagram of an alternate embodiment utilizing an optical region in the video image for generating the routing information;

FIG. 13 illustrates a block diagram illustrating the generation of a profile with the disclosed embodiment;

FIG. 16 illustrates a general block diagram of a disclosed embodiment;

FIG. 17 illustrates the conversion circuit of the wedge interface;

FIG. 18 illustrates a sample message packet transmitted from the user PC to the ARS;

FIG. 21 illustrates a diagrammatic view of information contained in the ARS database;

FIG. 22 illustrates a flowchart of the process of receiving information from the user's perspective;

FIG. 23 illustrates a flowchart according to the ARS;

DETAILED DESCRIPTION OF THE INVENTION

Figure 1:
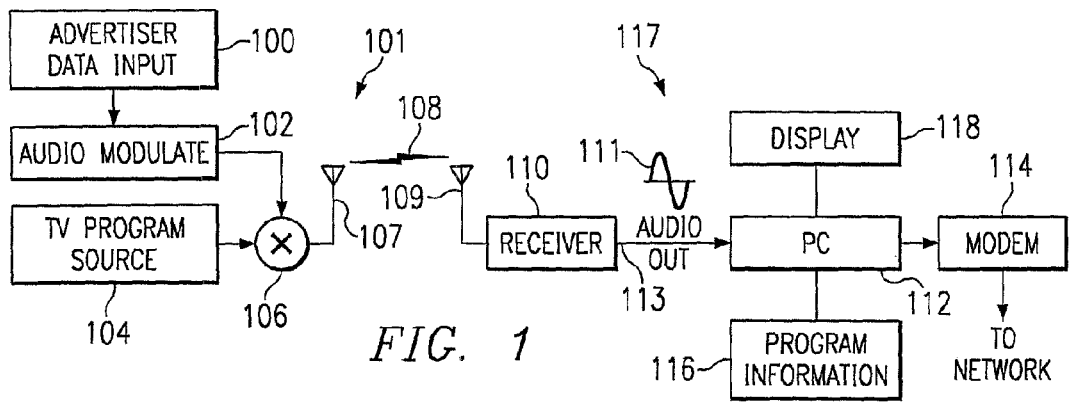
FIG. 1 illustrates a block diagram of the preferred embodiment.

Referring now to FIG. 1, there is illustrated a block diagram of a system for controlling a personal computer ("PC") 112 via an audio tone transmitted over a wireless system utilizing a TV. In the embodiment illustrated in FIG. 1, there is provided a transmission station 101 and a receive station 117 that are connected via a communication link 108. The transmission station 101 is comprised of a television program source 104, which is operable to generate a program in the form of a broadcast signal comprised of video and audio. This is transmitted via conventional techniques along channels in the appropriate frequencies. The program source is input to a mixing device 106, which mixing device is operable to mix in an audio signal. This audio signal is derived from an audio source 100 which comprises a coded audio signal which is then modulated onto a carrier which is combined with the television program source 104. This signal combining can be done at the audio level, or it can even be done at the RF level in the form of a different carrier. However, the preferred method is to merely sum the audio signal from the modulator 102 into the audio channel of the program that is generated by the television program source 104. The output thereof is provided from the mixing device 106 in the form of broadcast signal to an antenna 107, which transmits the information over the communication link 108 to an antenna 109 on the receive side.

On the receive side of the system, a conventional receiver 110, such as a television is provided. This television provides a speaker output which provides the user with an audible signal. This is typically associated with the program. However, the receiver 110 in the disclosed embodiment, also provides an audio output jack, this being the type RCA jack. This jack is utilized to provide an audio output signal on a line 113 which is represented by an audio signal 111. This line 113 provides all of the audio that is received over the communication link 108 to the PC 112 in the audio input port on the PC 112. However, it should be understood that, although a direct connection is illustrated from the receiver 110 to the PC 112, there actually could be a microphone pickup at the PC 112 which could pick the audio signal up. In the disclosed embodiment, the audio signal generated by the advertiser data input device 100 is audible to the human ear and, therefore, can be heard by the user. Therefore, no special filters are needed to provide this audio to the PC 112.

The PC 112 is operable to run programs thereon which typically are stored in a program file area 116. These programs can be any type of programs such as word processing programs, application programs, etc. In the disclosed embodiment, the program that is utilized in the system is what is referred to as a "browser." The PC 112 runs a browser program to facilitate the access of information on the network, for example, a global communication network known as the "Internet" or the World-Wide-Web ("Web"). The browser is a hypertext-linked application used for accessing information. Hypertext is a term used to describe a particular organization of information within a data processing system, and its presentation to a user. It exploits the computer's ability to link together information from a wide variety of sources to provide the user with the ability to explore a particular topic. The traditional style of presentation used in books employs an organization of the information which is imposed upon it by limitations of the medium, namely fixed sized, sequential paper pages. Hypertext systems, however, use a large number of units of text or other types of data such as image information, graphical information, video information, or sound information, which can vary in size. A collection of such units of information is termed a hypertext document, or where the hypertext documents employ information other than text, hypermedia documents. Multimedia communications may use the Hypertext Transfer Protocol ("HTTP"), and files or formatted data may use the Hypertext Markup Language ("HTML"). This formatting language provides for a mingling of text, graphics, sound, video, and hypertext links by "tagging" a text document using HTML. Data encoded using HTML is often referred to as an "HTML document," an "HTML page," or a "home page." These documents and other Internet resources may be accessed across the network by means of a network addressing scheme which uses a locator referred to as a Uniform Resource Locator ("URL"), for example, "http://www.digital.com."

The Internet is one of the most utilized networks for interconnecting distributed computer systems and allows users of these computer systems to exchange data all over the world. Connected to the Internet are many private networks, for example, corporate or commercial networks. Standard protocols, such as the Transport Control Protocol ("TCP") and the Internet Protocol ("IP") provide a convenient method for communicating across these diverse networks. These protocols dictate how data are formatted and communicated. As a characteristic of the Internet, the protocols are layered in an IP stack. At higher levels of the IP stack, such as the application layer (where HTTP is employed), the user information is more readily visible, while at lower levels, such as the network level (where TCP/IP are used), the data can merely be observed as packets or a stream of rapidly moving digital signals. Superimposed on the Internet is a standard protocol interface for accessing Web resources, such as servers, files, Web pages, mail messages, and the like. One way that Web resources can be accessed is by browsers made by Netscape® and Microsoft Internet Explorer®.

Referring again now to FIG. 1, the user can load this program with the appropriate keystrokes such that a browser window will be displayed on a display 118. In one embodiment, the user can run the browser program on the PC 112 such that the browser window is displayed on the display 118. While watching a preferred program, the user can also view display 118. When an audio signal is received by the receiver 110 and the encoded information is contained therein that was input thereto by the advertiser, the PC 112 will then perform a number of operations. The first operation, according to the disclosed embodiment, is to extract the audio information within the received audio signal in the form of digital data, and then transmit this digital data to a defined location on the global communication network via a modem connection 114. This connection will be described hereinbelow. This information will be relayed to a proprietary location and the instructions sent back to the PC 112 as to the location of the advertiser associated with the code, and the PC 112 will then effect a communication link to that location such that the user can view on the display 118 information that the advertiser, by the fact of putting the tone onto the broadcast channel, desires the viewer to view. This information can be in the form of interactive programs, data files, etc. In one example, when an advertisement appears on the television, the tone can be generated and then additional data displayed on the display 118. Additionally, a streaming video program could be played on the PC received over the network, which streaming video program is actually longer than the advertising segment on the broadcast. Another example would be a sports game that would broadcast the tone in order to allow a user access to information that is not available over the broadcast network, such as additional statistics associated with the sports program, etc.

By utilizing the system described herein with respect to the disclosed embodiment of FIG. 1, an advertiser is allowed the ability to control a user's PC 112 through the use of tones embedded within a program audio signal. As will described hereinbelow, the disclosed embodiment utilizes particular routing information stored in the PC 112 which allows the encoded information in the received audio signal to route this information to a desired location on the network, and then allow other routing information to be returned to the PC 112 for control thereof to route the PC 112 to the appropriate location associated with that code.

Figure 2:
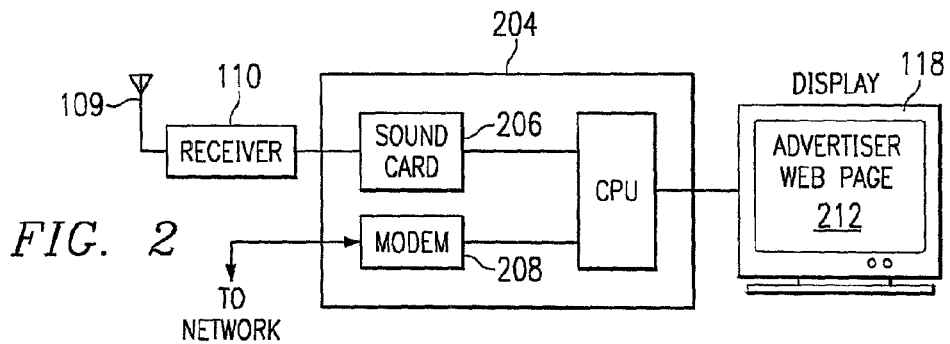
FIG. 2 illustrates the computer components employed in this embodiment.

Referring now to FIG. 2, there is illustrated a computer 204, similar to computer 112, connected to display information on display 118. The computer 204 comprises an internal audio or "sound" card 206 for receiving the transmitted audio signal through receive antenna 109 and receiver 110. The sound card 206 typically contains analog-to-digital circuitry for converting the analog audio signal into a digital signal. The digital signal may then be more easily manipulated by software programs. The receiver 110 separates the audio signal from the video signal. A special trigger signal located within the transmitted advertiser audio signal triggers proprietary software running on the computer 204 which launches a communication application, in this particular embodiment, the web browser application located on the PC 204. Coded advertiser information contained within the audio signal is then extracted and appended with the address of a proprietary server located on the communication network.

The remote server address is in the form of a URL. This appended data, in addition to other control codes, is inserted directly into the web browser application for automatic routing to the communication network. The web browser running on PC 204, and communicating to the network with an internal modem 208, in this embodiment, transmits the advertiser information to the remote server. The remote server cross-references the advertiser product information to the address of the advertiser server located on the network. The address of the advertiser server is routed back through the PC 204 web browser to the advertiser server. The advertiser product information is returned to PC 204 to be presented to the viewer on display 118. In this particular embodiment, the particular advertiser product information displayed is contained within the advertiser's web page 212. As mentioned above, the audio signal is audible to the human ear. Therefore the audio signal, as emitted from the TV speakers, may be input to the sound card 206 via a microphone. Furthermore, the audio signal need not be a real-time broadcast, but may be on video tapes, CDS, DVD, or other media which may be displayed at a later date. With the imminent implementation of high definition digital television, the audio signal output from the TV may also be digital. Therefore, direct input into a sound card for A/D purposes may not be necessary, but alternative interfacing techniques to accommodate digital-to-digital signal formats would apply.

Figure 3:
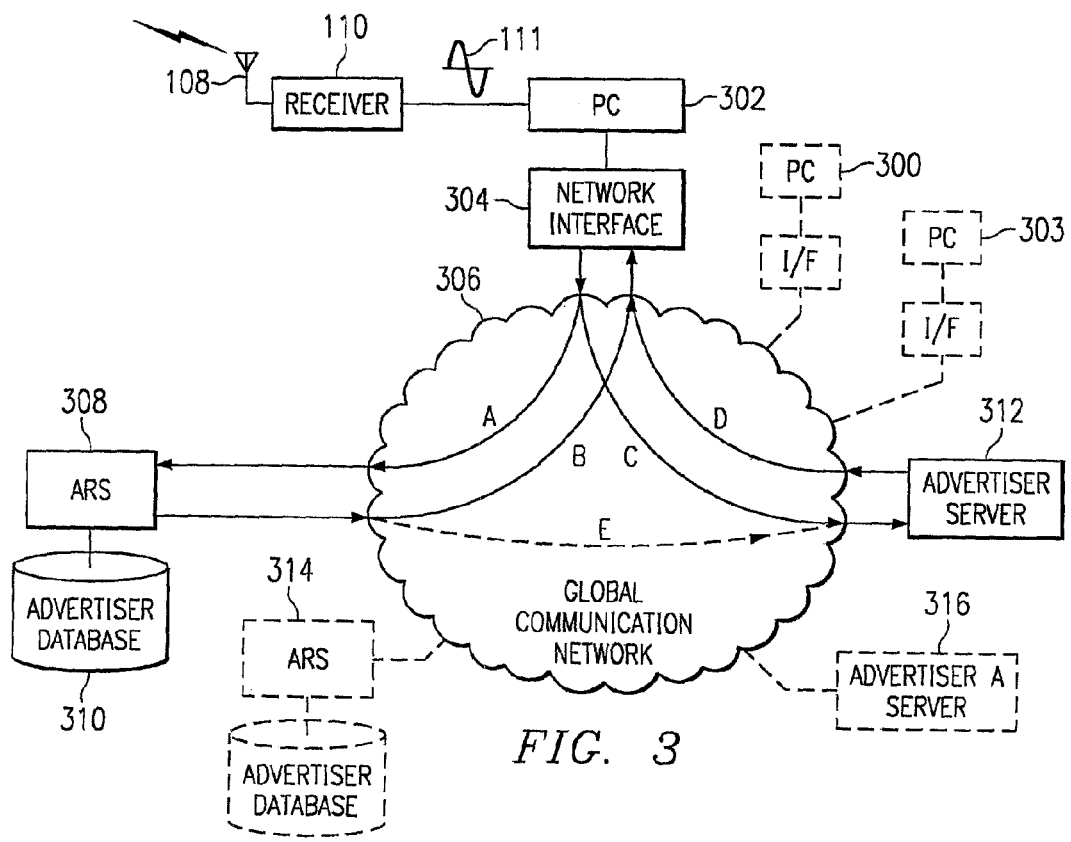
FIG. 3 illustrates system interactions over a global network.

Referring now to FIG. 3, there is illustrated a source PC 302, similar to PCS 204 and 112, connected to a global communication network ("GCN") 306 through an interface 304. In this embodiment, the audio signal 111 is received by PC 302 through its sound card 206. The audio signal 111 comprises a trigger signal which triggers proprietary software into launching a web browser application residing on the PC 302. The audio signal 111 also comprises advertiser product information which is extracted and appended with URL information of an Advertiser Reference Server ("ARS") 308. The ARS 308 is a system disposed on the GCN 306 that is defined as the location to which data in the audio signal 111 is to be routed. As such, data in the audio signal 111 will always be routed to the ARS 308, since a URL is unique on the GCN 306. Connected to the ARS 308 is a database 310 of product codes and associated manufacturer URLs. The database 310 undergoes a continual update process which is transparent to the user. As companies sign-on, i.e., subscribe, to this technology, manufacturer and product information is added to the database 310 without interrupting operation of the source PC 302 with frequent updates. When the advertiser server address URL is obtained from the ARS database 310, it and the request for the particular advertiser product information are automatically routed back through the web browser on PC 302, over to the respective advertiser server for retrieval of the advertiser product information to the PC 302. Additionally, although the disclosed invention discusses a global communication network, the system is also applicable to LANs, WANs, and peer-to-peer network configurations. It should be noted that the disclosed architecture is not limited to a single source PC 302, but may comprise a plurality of source PCS, e.g., PC 300 and PC 303. Moreover, a plurality of ARS 308 systems and advertiser servers 312 may be implemented, e.g., ARS 314, and advertiser server A 316, respectively.

The information transactions, in general, which occur between the networked systems of this embodiment, over the communication network, are the following. The web browser running on source PC 302 transmits a message packet to the ARS 308 over Path "A." The ARS 308 decodes the message packet and performs a cross-reference function with product information extracted from the received message packet to obtain the address of an advertiser server 312. A new message packet is assembled comprising the advertiser server 312 address, and sent back to the source PC 302 over Path "B." A "handoff" operation is performed whereby the source PC 302 browser simply reroutes the information on to the advertiser server 312 over Path "C," with the appropriate source and destination address appended. The advertiser server 312 receives and decodes the message packet. The request-for-advertiser-product-information is extracted and the advertiser 312 retrieves the requested information from its database for transmission back to the source PC 302 over Path "D." The source PC 302 then processes the information, i.e., for display to the viewer. The optional Path "E" is discussed hereinbelow. It should be noted that the disclosed methods are not limited to only browser communication applications, but may accommodate, with sufficient modifications by one skilled in the art, other communication applications used to transmit information over the Internet or communication network.

Referring now to FIG. 4a, the message packet 400 sent from the source PC 302 to ARS 308 via Path "A" comprises several fields. One field comprises the URL of the ARS 308 which indicates where the message packet is to be sent. Another field comprises the advertiser product code or other information derived from the audio signal 111, and any additional overhead information required for a given transaction. The product code provides a link to the address of the advertiser server 312, located in the database 310. Yet another field comprises the network address of the source PC 302. In general, network transmissions are effected in packets of information, each packet providing a destination address, a source address, and data. These packets vary depending upon the network transmission protocol utilized for communication. Although the protocols utilized in the disclosed embodiment are of a conventional protocol suite commonly known as TCP/IP, it should be understood that any protocols providing the similar basic functions can be used, with the primary requirement that a browser can forward the routing information to the desired URL in response to keystrokes being input to a PC. Within the context of this disclosure, "message packet" shall refer to and comprise the destination URL, product information, and source address, even though more than a single packet must be transmitted to effect such a transmission.

Upon receipt of the message packet 400 from source PC 302, ARS 308 processes the information in accordance with instructions embedded in the overhead information. The ARS 308 specifically will extract the product code information from the received packet 400 and, once extracted, will then decode this product code information. Once decoded, this information is then compared with data contained within the ARS advertiser database 310 to determine if there is a "hit." If there is no "hit" indicating a match, then information is returned to the browser indicating such. If there is a "hit," a packet 402 is assembled which comprises the address of the source PC 302, and information instructing the source PC 302 as to how to access, directly in a "handoff" operation, another location on the network, that of an advertiser server 312. This type of construction is relatively conventional with browsers such as Netscape® and Microsoft Internet Explorer® and, rather than displaying information from the ARS 308, the source PC 302 can then access the advertiser server 312. The ARS 308 transmits the packet 402 back to source PC 302 over Path "B." Referring now to FIG. 4b, the message packet 402 comprises the address of the source PC 302, the URL of the advertiser server 312 embedded within instructional code, and the URL of the ARS 308.

Upon receipt of the message packet 402 by the source PC 302, the message packet 402 is disassembled to obtain pertinent routing information for assembly of a new message packet 404. The web browser running on source PC 302 is now directed to obtain, over Path "C," the product information relevant to the particular advertiser server 312 location information embedded in message packet 404. Referring now to FIG. 4c, the message packet 404 for this transaction comprises the URL of the advertiser server 312, the request-for-product-information data, and the address of the source PC 302.

Upon receipt of the message packet 404 from source PC 302, advertiser server 312 disassembles the message packet 404 to obtain the request-for-product-information data. The advertiser server 312 then retrieves the particular product information from its database, and transmits it over Path "D" back to the source PC 302. Referring now to FIG. 4d, the message packet 406 for this particular transaction comprises the address of the source PC 302, the requested information, and the URL of the advertiser server 312.

Optionally, the ARS 308 may make a direct request for product information over Path "E" to advertiser server 312. In this mode, the ARS 308 sends information to the advertiser server 312 instructing it to contact the source PC 302. This, however, is unconventional and requires more complex software control. The message packet 408 for this transaction is illustrated in FIG. 4e, which comprises the URL of the advertiser server 312, the request-for-product-information data, and the address of the source PC 302. Since product information is not being returned to the ARS 308, but directly to the source PC 302, the message packet 408 requires the return address to be that of the source PC 302. The product information is then passed directly to PC 302 over Path "D."

Referring now to FIG. 5, the method for detecting and obtaining product information is as follows. In decision block 500, a proprietary application running resident on a source computer PC 302 (similar to PC 204) monitors the audio input for a special trigger signal. Upon detection of the trigger signal, data following the trigger signal is decoded for further processing, in function block 502. In function block 504, the data is buffered for further manipulation. In decision block 506, a determination is made as to whether the data can be properly authenticated. If not, program flow continues through the "N" signal to function block 520 where the data is discarded. In function block 522, the program then signals for a retransmission of the data. The system then waits for the next trigger signal, in decision block 500. If properly authenticated in decision block 506, program flow continues through the "Y" signal path where the data is then used to launch the web browser application, as indicated in function block 508. In function block 510, the web browser receives the URL data, which is then automatically routed through the computer modem 208 to the network interface 304 and ultimately to the network 306. In function block 514, the ARS 308 responds by returning the URL of advertiser server 312 to the PC 302. In function block 516, the web browser running on the source PC 302, receives the advertiser URL information from the ARS 308, and transmits the URL for the product file to the advertiser server 312. In block 518, the advertiser server 312 responds by sending the product information to the source PC 302 for processing.

The user may obtain the benefits of this architecture by simply downloading the proprietary software over the network. Other methods for obtaining the software are well-known; for example, by CD, diskette, or pre-loaded hard drives.

Referring now to FIG. 6, there is illustrated a flowchart of the process the ARS 308 may undergo when receiving the message packet 400 from the source PC 302. In decision block 600, the ARS 308 checks for the receipt of the message packet 400. If a message packet 400 is not received, program flow moves along the "N" path to continue waiting for the message. If the message packet 400 is received, program flow continues along path "Y" for message processing. Upon receipt of the message packet 400, in function block 602, the ARS 308 decodes the message packet 400. The product code is then extracted independently in function block 604 in preparation for matching the product code with the appropriate advertiser server address located in the database 310. In function block 606, the product code is then used with a lookup table to retrieve the advertiser server 312 URL of the respective product information contained in the audio signal data. In function block 608, the ARS 308 then assembles message packet 402 for transmission back to the source PC 302. Function block 610 indicates the process of sending the message packet 402 back to the source PC 302 over Path "B."

Referring now to FIG. 7, there is illustrated a flowchart of the interactive processes between the source PC 302 and the advertiser server 312. In function block 700, the source PC 302 receives the message packet 402 back from the ARS 308 and begins to decode the packet 402. In function block 702, the URL of the advertiser product information is extracted from the message packet 402 and saved for insertion into the message packet 404 to the advertiser server 312. The message packet 404 is then assembled and sent by the source PC 302 over Path "C" to the advertiser server 312, in function block 704. While the source PC 302 waits, in function block 706, the advertiser server 312 receives the message packet 404 from the source PC 302, in function block 708, and disassembles it. The product information location is then extracted from the message packet 404 in function block 710. The particular product information is retrieved from the advertiser server 312 database for transmission back to the source PC 302. In function block 712, the product information is assembled into message packet 406 and then transmitted back to the source PC 302 over Path "D." Returning to the source PC 302 in function block 714, the advertiser product information contained in the message packet 406 received from the advertiser server 312, is then extracted and processed in function block 716.

Figure 8:
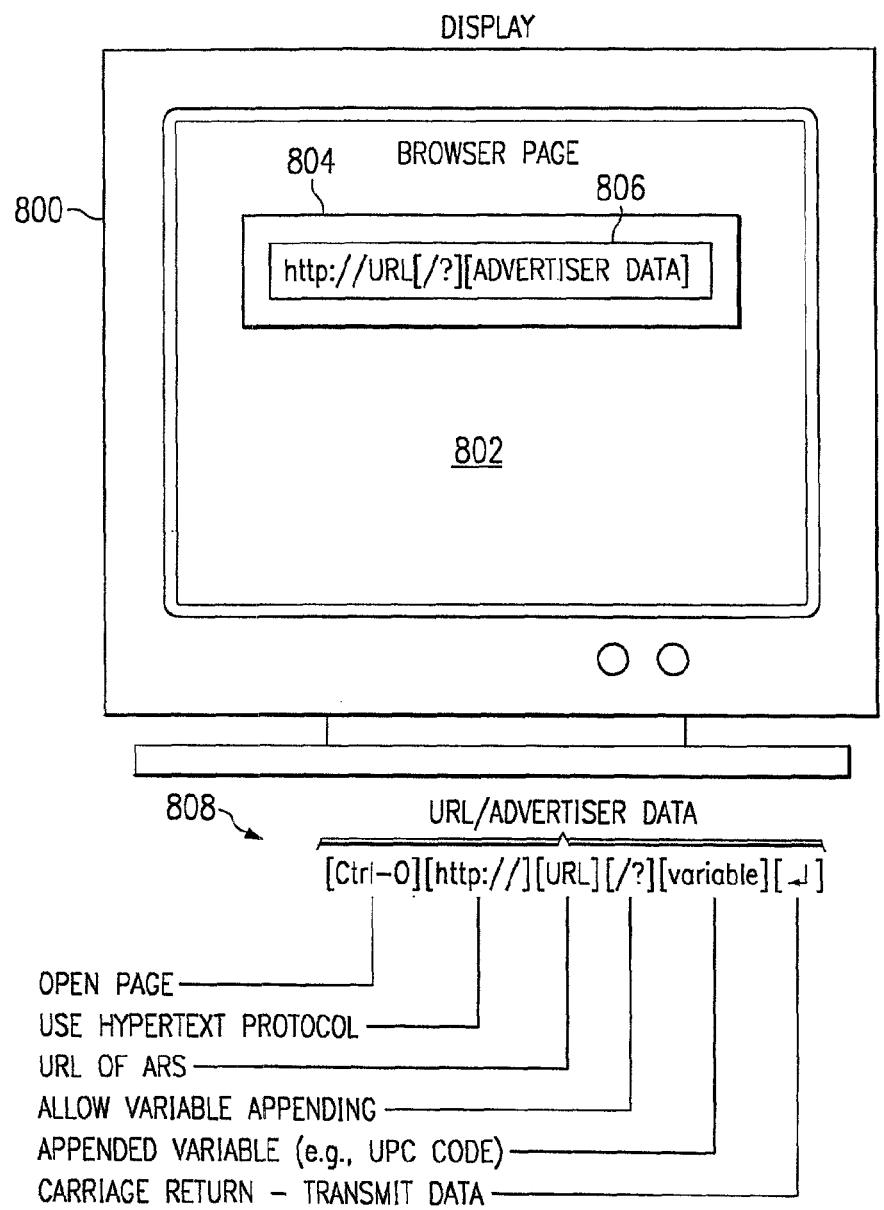
FIG. 8 illustrates a web browser page receiving the modified URL/advertiser product data according to the preferred embodiment.

Referring now to FIG. 8, after receipt of a trigger signal, a web browser application on a source PC 302 is automatically launched and computer display 800 presents a browser page 802. Proprietary software running on the source PC 302 processes the audio signal data after being digitized through the sound card 206. The software appropriately prepares the data for insertion directly into the web browser by extracting the product information code and appending keystroke data to this information. First, a URL page 804 is opened in response to a Ctrl-O command added by the proprietary software as the first character string. Opening URL page 804 automatically positions the cursor in a field 806 where additional keystroke data following the Ctrl-O command will be inserted. After URL page 804 is opened, the hypertext protocol preamble http:// is inserted into the field 806. Next, URL information associated with the location of the ARS 308 is inserted into field 806. Following the ARS 308 URL data are the characters /? to allow entry of variables immediately following the /? characters. In this embodiment, the variable following is the product information code received in the audio signal. The product code information also provides the cross-reference information for obtaining the advertiser URL from the ARS database 310. Next, a carriage return is added to send the URL/product data and close the window 804. After the message packet 400 is transmitted to the ARS 308 from the source PC 302, transactions from the ARS 308, to the source PC 302, to the advertiser server 312, and back to the source PC 302, occur quickly and are transparent to the viewer. At this point, the next information the viewer sees is the product information which was received from the advertiser server 312.

Figure 9:
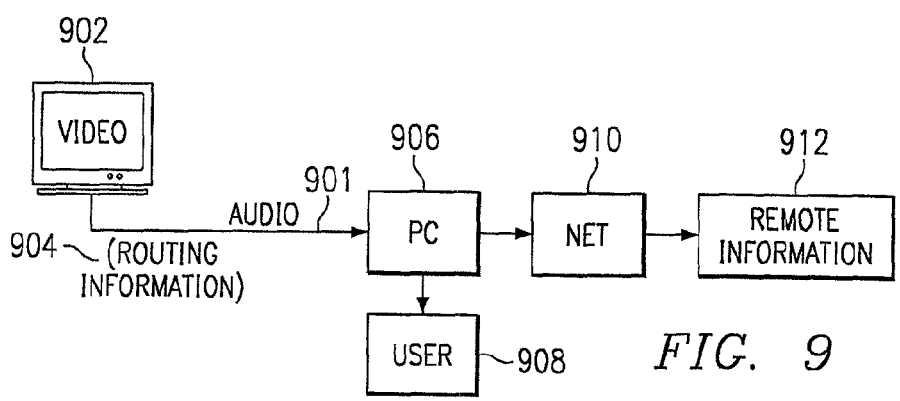
FIG. 9 illustrates a simplified block diagram of the disclosed embodiment.

Referring now to FIG. 9, there is illustrated a block diagram of a more simplified embodiment. In this embodiment, a video source 902 is provided which is operable to provide an audio output on an audio cable 901 which provides routing information referred to by reference numeral 904. The routing information 904 is basically information contained within the audio signal. This is an encoded or embedded signal. The important aspect of the routing information 904 is that it is automatically output in realtime as a function of the broadcast of the video program received over the video source 902. Therefore, whenever the program is being broadcast in realtime to the user 908, the routing information 904 will be output whenever the producer of the video desires it to be produced. It should be understood that the box 902 representing the video source could be any type of media that will result in the routing information being output. This could be a cassette player, a DVD player, an audio cassette, a CD ROM or any such media. It is only important that this is a program that the producer develops which the user 908 watches in a continuous or a streaming manner. Embedded within that program, at a desired point selected by the producer, the routing information 904 is output.

The audio information is then routed to a PC 906, which is similar to the PC 112 in FIG. 1. A user 908 is interfaced with the PC to receive information thereof, the PC 906 having associated therewith a display (not shown). The PC 906 is interfaced with a network 910, similar to the network 306 in FIG. 3. This network 910 has multiple nodes thereon, one of which is the PC 906, and another of which is represented by a network node 912 which represents remote information. The object of the present embodiment is to access remote information for display to the user 908 by the act of transmitting from the video program in block 902 the routing information 904. This routing information 904 is utilized to allow the PC 906 which has a network "browser" running thereon to "fetch" the remote information at the node 912 over the network 910 for display to the user 908. This routing information 904 is in the form of an embedded code within the audio signal, as was described hereinabove.

Referring now to FIG. 10, there is illustrated a more detailed block diagram of the embodiment of FIG. 9. In this embodiment, the PC 906 is split up into a couple of nodes, a first PC 1002 and a second PC 1004. The PC 1002 resides at the node associated with the user 908, and the PC 1004 resides at another node. The PC 1004 represents the ARS 308 of FIG. 3. The PC 1004 has a database 1006 associated therewith, which is basically the advertiser database 310. Therefore, there are three nodes on the network 910 necessary to implement the disclosed embodiment, the PC 1002, the PC 1004 and the remote information node 912. The routing information 904 is utilized by the PC 1002 for routing to the PC 1004 to determine the location of the remote information node 912 on the network 910. This is returned to the PC 1002 and a connection made directly with the remote information node 912 and the information retrieved therefrom to the user 908. The routing information 904 basically constitutes primary routing information.

Referring now to FIG. 11, there is illustrated a diagrammatic view of how the network packet is formed for sending the primary routing information to the PC 1004. In general, the primary routing information occupies a single field which primary routing information is then assembled into a data packet with the secondary routing information for transfer to the network 910. This is described hereinabove in detail.

Referring now to FIG. 12, there is illustrated an alternate embodiment to that of FIG. 9. In this embodiment, the video source 902 has associated therewith an optical region 1202, which optical region 1202 has disposed therein an embedded video code. This embedded video code could be relatively complex or as simple as a grid of dark and white regions, each region in the grid able to have a dark color for a logic "1" or a white region for a logic "0." This will allow a digital value to be disposed within the optical region 1202. A sensor 1204 can then be provided for sensing this video code. In the example above, this would merely require an array of optical detectors, one for each region in the grid to determine whether this is a logic "1" or a logic "0" state. One of the sensed video is then output to the PC 906 for processing thereof to determine the information contained therein, which information contained therein constitutes the primary routing information 904. Thereafter, it is processed as described hereinabove with reference to FIG. 9.

Referring now to FIG. 13, there is illustrated a block diagram for an embodiment wherein a user's profile can be forwarded to the original subscriber or manufacturer. The PC 906 has associated therewith a profile database 1302, which profile database 1302 is operable to store a profile of the user 908. This profile is created when the program, after initial installation, requests profile information to be input in order to activate the program. In addition to the profile, there is also a unique ID that is provided to the user 908 in association with the browser program that runs on the PC 906. This is stored in a storage location represented by a block 1304. This ID 1304 is accessible by a remote location as a "cookie" which is information that is stored in the PC 906 in an accessible location, which accessible location is actually accessible by the remote program running on a remote node.

The ARS 308, which basically constitutes the PC 1004 of FIG. 10, is operable to have associated therewith a profile database 1308, which profile database 1308 is operable to store profiles for all of the users. The profile database 1308 is a combination of the stored in profile database 1302 for all of the PCS 906 that are attachable to the system. This is to be distinguished from the information stored in the database 310 of the ARS 308, the advertiser's database, which contains intermediate destination tables. When the routing information in the primary routing information 904 is forwarded to the ARS 308 and extracted from the original data packet, the lookup procedure described hereinabove can then be performed to determine where this information is to be routed. The profile database 1302 is then utilized for each transaction, wherein each transaction in the form of the routing information received from the primary routing information 904 is compared to the destination tables of database 310 to determine what manufacturer is associated therewith.

The associated ID 1304 that is transmitted along with the routing information in primary routing information 904 is then compared with the profile database 1308 to determine if a profile associated therewith is available. This information is stored in a transaction database 1310 such that, at a later time, for each routing code received in the form of the information in primary routing information 904, there will associated therewith the IDs 1304 of each of the PCS 906. The associated profiles in database 1308, which are stored in association with IDs 1304, can then be assembled and transmitted to a subscriber as referenced by a subscriber node 1312 on the network 910. The ARS 308 can do this in two modes, a realtime mode or a non-realtime mode. In a realtime mode, each time a PC 906 accesses the advertiser database 310, that user's profile information is uploaded to the subscriber node 1312. At the same time, billing information is generated for that subscriber 1312 which is stored in a billing database 1316. Therefore, the ARS 308 has the ability to inform the subscriber 1312 of each transaction, bill for those transactions, and also provide to the subscriber 1312 profile information regarding who is accessing the particular product advertisement having associated therewith the routing information field 904 for a particular routing code as described hereinabove. This information, once assembled, can then be transmitted to the subscriber 1312 and also be reflected in billing information and stored in the billing information database 1316.

Figure 14:
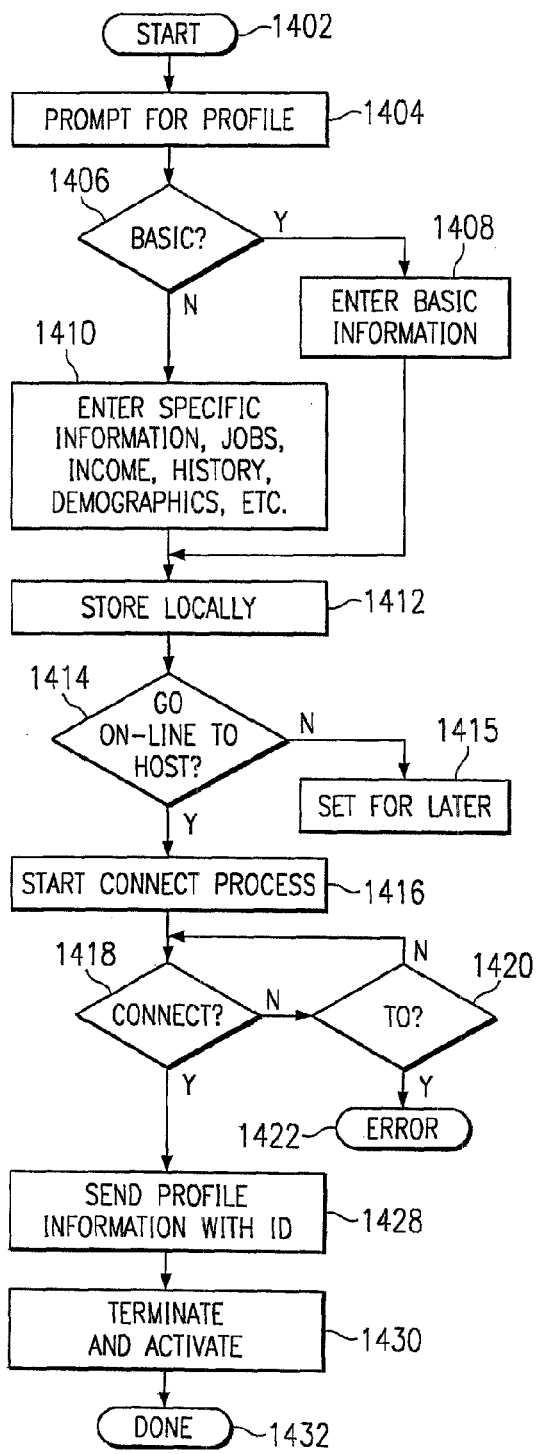
FIG. 14 illustrates a flowchart for generating the profile and storing at the ARS.

Referring now to FIG. 14, there is illustrated a flowchart depicting the operation for storing the profile for the user. The program is initiated in a block 1402 and then proceeds to a function block 1404, wherein the system will prompt for the profile upon initiation of the system. This initiation is a function that is set to activate whenever the user initially loads the software that he or she is provided. The purpose for this is to create, in addition to the setup information, a user profile. Once the user is prompted for this, then the program will flow to a decision block 1406 to determine whether the user provides basic or detailed information. This is selectable by the user. If selecting basic, the program will flow to a function block 1408 wherein the user will enter basic information such as name and serial number and possibly an address. However, to provide some incentive to the user to enter more information, the original prompt in function block 1404 would have offers for such things as coupons, discounts, etc., if the user will enter additional information. If the user selects this option, the program flows from the decision block 1406 to a function block 1410. In the function block 1410, the user is prompted to enter specific information such as job, income level, general family history, demographic information and more. There can be any amount of information collected in this particular function block.

Once all of the information is collected, in either the basic mode or the more specific mode, the program will then flow to a function block 1412 where this information is stored locally. The program then flows to a decision block 1414 to then go on-line to the host or the ARS 308. In general, the user is prompted to determine whether he or she wants to send this information to the host at the present time or to send it later. If he or she selects the "later" option, the program will flow to a function block 1415 to prompt the user at a later time to send the information. In the disclosed embodiment, the user will not be able to utilize the software until the profile information is sent to the host. Therefore, the user may have to activate this at a later time in order to connect with the host.

If the user has selected the option to upload the profile information to the host, the program will flow to the function block 1416 to initiate the connect process and then to a decision block 1418 to determine if the connection has been made. If not, the program will flow along a "N" path to a time to decision block 1420 which will timeout to an error block 1422 or back to the input of the connect decision block 1418. The program, once connected, will then flow along a "Y" path from decision block 1418 to a function block 1428 to send the profile information with the ID of the computer or user to the host. The ID is basically, as described hereinabove, a "cookie" in the computer which is accessed by the program when transmitting to the host. The program will then flow to a function block 1430 to activate the program such that it, at later time, can operate without requiring all of the setup information. In general, all of the operation of this flowchart is performed with a "wizard" which steps the user through the setup process. Once complete, the program will flow to a Done block 1432.

Figure 15:
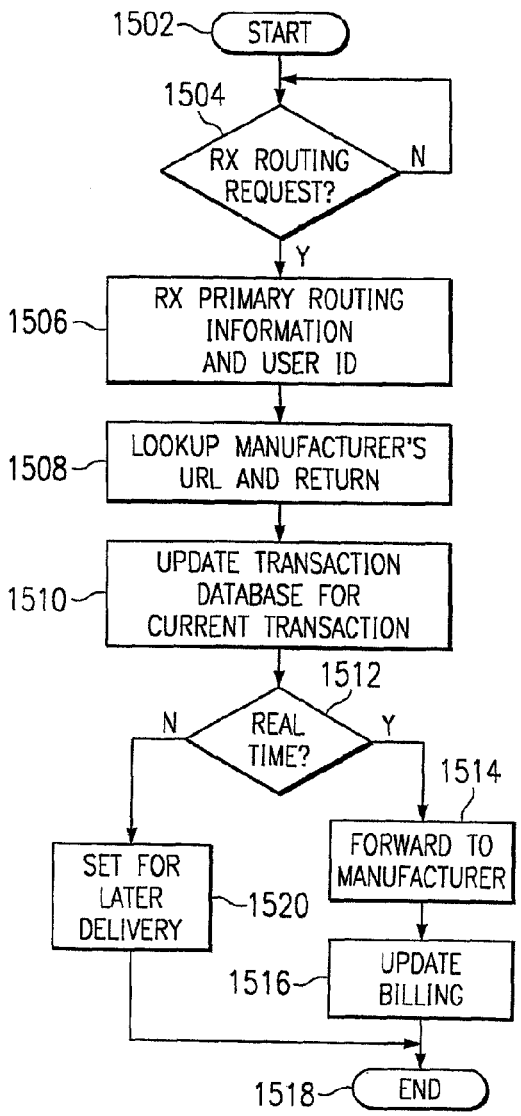
FIG. 15 illustrates a flowchart for processing the profile information when information is routed to a user.

Referring now to FIG. 15, there is illustrated a flowchart depicting the operation of the host when receiving a transaction. The program is initiated at a Start block 1502 and then proceeds to decision block 1504, wherein it is determined whether the system has received a routing request, i.e., the routing information 904 in the form of a tone, etc., embedded in the audio signal, as described hereinabove with respect to FIG. 9. The program will loop back around to the input of decision block 1504 until the routing request has been received. At this time, the program will flow along the "Y" path to a function block 1506 to receive the primary routing information and the user ID. Essentially, this primary routing information is extracted from the audio tone, in addition to the user ID. The program then flows to a function block 1508 to look up the manufacturer URL that corresponds to the received primary routing information and then return the necessary command information to the originating PC 108 in order to allow that PC 108 to connect to the destination associated with the primary routing information. Thereafter, the program will flow to a function block 1510 to update the transaction database 1310 for the current transaction. In general, the routing information 904 will be stored as a single field with the associated IDs. The profile database 1308, as described hereinabove, has associated therewith detailed profiles of each user on the system that has activated their software in association with their ID. Since the ID was sent in association with the routing information, what is stored in the transaction database 1310 is the routing code, in association with all of the IDs transmitted to the system in association with that particular routing code. Once this transaction database 1310 has been updated, as described hereinabove, the transactions can be transferred back to the subscriber at node 312 with the detailed profile information from the profile database 1308.

The profile information can be transmitted back to the subscriber or manufacturer at the node 312 in realtime or non-realtime. A decision block 1512 is provided for this, which determines if the delivery is realtime. If realtime, the program will flow along a "Y" path to a function block 1514 wherein the information will be immediately forwarded to the manufacturer or subscriber. The program will then flow to a function block 1516 wherein the billing for that particular manufacturer or subscriber will be updated in the billing database 1316. The program will then flow into an End block 1518. If it was non-realtime, the program moves along the "N" path to a function block 1520 wherein it is set for a later delivery and it is accrued in the transaction database 1310. In any event, the transaction database 1310 will accrue all information associated with a particular routing code.

With a realtime transaction, it is possible for a manufacturer to place an advertisement in a magazine or to place a product on a shelf at a particular time. The manufacturer can thereafter monitor the times when either the advertisements are or the products are purchased. Of course, they must be scanned into a computer which will provide some delay. However, the manufacturer can gain a very current view of how a product is moving. For example, if a cola manufacturer were to provide a promotional advertisement on, for example, television, indicating that a new cola was going to be placed on the shelf and that the first 1000 purchasers, for example, scanning their code into the network would receive some benefit, such as a chance to win a trip to some famous resort in Florida or some other incentive, the manufacturer would have a very good idea as to how well the advertisement was received. Further, the advertiser would know where the receptive markets were. If this advertiser, for example, had placed the television advertisement in ten cities and received overwhelming response from one city, but very poor response from another city, he would then have some inclination to believe that either the one poor-response city was not a good market or that the advertising medium he had chosen was very poor. Since the advertiser can obtain a relatively instant response and also content with that response as to the demographics of the responder, very important information can be obtained in a relatively short time.

It should be noted that the disclosed embodiment is not limited to a single source PC 302, but may encompass a large number of source computers connected over a global communication network. Additionally, the embodiment is not limited to a single ARS 308 or a single advertiser server 312, but may include a plurality of ARS and advertiser systems, indicated by the addition of ARS 314 and advertiser server A 316, respectively. It should also be noted that this embodiment is not limited only to global communication networks, but also may be used with LAN, WAN, and peer-to-peer configurations.

It should also be noted that the disclosed embodiment is not limited to a personal computer, but is also applicable to, for example, a Network Computer ("NetPC"), a scaled-down version of the PC, or any system which accommodates user interaction and interfaces to information resources.

One typical application of the above noted technique is for providing a triggering event during a program, such as a sport event. In a first example, this may be generated by an advertiser. One could imagine that, due to the cost of advertisements in a high profile sports program, there is a desire to utilize this time wisely. If, for example, an advertiser contracted for 15 seconds worth of advertising time, they could insert within their program a tone containing the routing information. This routing information can then be output to the user's PC 302 which will cause the user's PC 302 to, via the network, obtain information from a remote location typically controlled by the advertiser. This could be in the form of an advertisement of a length longer than that contracted for. Further, this could be an interactive type of advertisement. An important aspect to the type of interaction between the actual broadcast program with the embedded routing information and the manufacturer's site is the fact that there is provided information as to the user's PC 302 and a profile of the user themselves. Therefore, an advertiser can actually gain realtime information as to the number of individuals that are watching their particular advertisement and also information as to the background of those individuals, profile information, etc. This can be a very valuable asset to an advertiser.

In another example, the producer of the program, whether it be an on-air program, a program embedded in a video tape, CD-ROM, DVD, or a cassette, can allow the user to automatically access additional information that is not displayed on the screen. For example, in a sporting event, various statistics can be provided to the user from a remote location, merely by the viewer watching the program. When these statistics are provided, the advertiser can be provided with profile information and background information regarding the user. This can be important when, for example, the user may record a sports program. If the manufacturer sees that this program routing code is being output from some device at a time later than the actual broadcast itself, this allows the advertisers to actually see that their program is still being used and also what type of individual is using it. Alternatively, the broadcaster could determine the same and actually bill the advertiser an additional sum for a later broadcast. This is all due to the fact that the routing information automatically, through a PC and a network, will provide an indication to the advertiser the time at which the actual information was broadcast.

The different type of medium that can be utilized with the above embodiment are such things as advertisements, which are discussed hereinabove, contests, games, news programs, education, coupon promotional programs, demonstration media (demos), and photographs, all of which can be broadcast on a private site or a public site. This all will provide the ability to allow realtime interface with the network and the remote location for obtaining the routed information and also allow for realtime billing and accounting.

Referring now to FIG. 16, there is illustrated a general block diagram of a disclosed embodiment. A bar code scanning input device 1600 is provided by an input device distributor to customers and is associated with that distributor via a input device ID stored therein. The input device 1600 is either sold or freely distributed to customers for use with their personal computing systems. Since more and more products are being sold using bar codes, it can be appreciated that a user having the input device 1600 can scan bar codes of a multitude of products in order to obtain more information. Information about these products can be made immediately available to the user from the manufacturer for presentation by the user's computer 302. Beyond simply displaying information about the product in which the user is interested, the input device distributor may include additional advertising information for display to the user such as information about other promotions or products provided or sold by the input device distributor. Similarly, advertisers may provide catalogs of advertisements or information in newspapers or periodicals where the user simply scans the bar code associated with the advertisement using the input device 1600 to obtain further information. There is provided a paper source 1602 having contained thereon an advertisement 1604 and an associated bar code 1606. (Note that the disclosed concept is not limited to scanning of bar codes 1606 from paper sources 1602, but is also operable to scan a bar code 1606 on the product itself. Also, the input device 1600 can be any type of device that will scan any type of image having information encoded therein.)

After obtaining the input device 1600 from the input device distributor, the user connects the input device 1600 to their PC 302. During a scanning operation, input device 1600 reads bar code data 1606 and the input device ID into a "wedge" interface 1608 for conversion into keyboard data, which keyboard data is passed therefrom into the keyboard input port of PC 302. The importance of the input device ID will be discussed in more detail hereinbelow.

The wedge interface 1608 is simply an interface box containing circuitry that accommodates inputs from both the scanning input device 1600 and a computer keyboard 1610. This merely allows the information scanned by the input device 1600 to be input into the PC 302. In the disclosed embodiment, the wedge interface 1608 will convert any information. The data output from the input device 1600 is passed into the wedge interface 1608 for conversion into keyboard data which is readily recognizable by the PC 302. Therefore, the input device 1600 is not required to be connected to a separate port on the PC 302. This data is recognized as a sequence of keystrokes. However, the output of the input device 1600 can be input in any manner compatible with the PC 302. When not receiving scanner data, the wedge interface 1608 simply acts as a pass-through device for keyboard data from the keyboard 1610. In any case, the information is ultimately processed by a processor in the PC 302 and can be presented to the user on a display 1612. The wedge interface 1608 is operable to provide a decoding function for the bar code 1606 and conversion thereof to keystroke input data.

In operation, the product code of a product is provided in the form of a bar code 1606. This bar code 1606 is the "link" to a product. The disclosed embodiment is operable to connect that product information contained in the bar code 1606 with a web page of the manufacturer of that product by utilizing the bar code 1606 as the product "identifier." The program operating on the PC 302 provides routing information to the ARS 308 after launching the browser on the PC 302 and connecting to the ARS 308 over the GCN 306, which ARS 308 then performs the necessary steps to cause the browser to connect to the manufacturer web site, while also providing for an accounting step, as will be described in more detail hereinbelow.

The bar code 1606 by itself is incompatible with any kind of network for the purposes of communication therewith. It is primarily provided for a retail-type setting. Therefore, the information contained in the bar code 1606, by itself, does not allow for anything other than identification of a product, assuming that one has a database 1614 containing information as to a correlation between the product and the bar code 1606.

The wedge interface 1608 is operable to decode the bar code 1606 to extract the encoded information therein, and append to that decoded bar code information relating to an ID for the input device 1600. This information is then forwarded to the ARS 308 by the resident program in the PC 302. This is facilitated by intermediate routing information stored in the program indicating to which node on the GCN 306 the scanned bar code information is to be sent, i.e., to the ARS 308. It is important to note that the information in the bar code 1606 must be converted from its optical image to numerical values which are then ultimately input to the keyboard input port of PC 302 and converted into data compatible with communication software residing on the PC 302 (in this case, HTML language for insertion into a browser program). When the scanned information is input to the PC 302, the resident program launches the browser program and then assembles a communication packet comprised of the URL of the ARS 308, the input device ID and the user ID. If another type of communications program were utilized, then it would have to be converted into language compatible with that program. Of course, a user could actually key in the information on the bar code 102 and then append the appropriate intermediate routing information thereafter. As will be described hereinbelow, the intermediate routing information appended thereto is the URL of the ARS 308 disposed on the GCN 306.

As part of the configuration for using the input device 1600, the PC 302 hosts input device software which is operable to interpret data transmitted from the input device 1600, and to create a message packet having the scanned product information and input device ID, routing information, and a user ID which identifies the user location of the input device 1600. The input device software loads at boot-up of the PC 302 and runs in the background. In response to receiving a scanned bar code 1606, the wedge interface 1608 outputs a keystroke code (e.g., ALT-F10) to bring the input device program into the foreground for interaction by the operating system. The input device program then inserts the necessary information into the browser program. The message packet is then transmitted to interface 304 across the global communication network 306 to the ARS 308. The ARS 308 interrogates the message packet and performs a lookup function using the ARS database 310. If a match is found between particular parameters of the message packet, a return message packet is sent back to the PC 302 for processing.

The input device program running on PC 302 functions to partition the browser window displayed to the user into several individual areas. This is for the purpose of preparing to present to the user selected information in each of the individual areas (also called "framing"). The selected information comprises the product information which the user requested by scanning the bar code 1606 using the input device 1600, information about the input device distributor which establishes the identity of the company associated with that particular input device 1600, and at least one or more other frames which may be advertisements related to other products that the input device distributor sells. Note that the advertisements displayed by the input device distributor may be related to the product of interest or totally unrelated. For example, if a user scans the bar code 1606 of a soda from Company A, the input device distributor may generate an advertisement of a new soft drink being marketed by Company A, that it sells. On the other hand, the input device distributor may also structure the display of information to the user such that a user requesting product information of a Product X may get the requested information of Product X along with advertisements for a competing item Product Y. Essentially, the input device distributor is free to generate any advertisement to the user in response to the user requesting product information.

The return message packet transmitted from the ARS 308 to the PC 302 is then transmitted back across the GCN 306 to the advertiser server 312. The advertiser server 312 restructures the message packet and appends the particular product information for transmission back to the PC 302. Upon receiving the particular advertiser information from advertiser server 312, the PC 302 then retransmits a message to the input device distributor site 1616 and E-commerce site 1618 to obtain the information that needs to be framed in the browser window displayed to the user.

Therefore, the input device 1600 is associated with the input device distributor by way of an input device ID such that scanning a product bar code 1606 in order to obtain information about that particular product generates one or more responses from one or more remote sites disposed on the GCN 306. Stored in the input device 1600 is the input device ID which establishes its relationship to the input device distributor. Proprietary input device software running on the PC 302 operates to decode scanned bar code information and the input device ID received from the input device 1600 and wedge interface 1608, and also provides a unique user ID for establishing the location of the user of the input device 1600. The input device software also assembles message packets and works in conjunction with the on-board communication software (e.g., a browser) to automatically route the message packets across the GCN 306 such that the one or more remote sites disposed on the GCN 306 return information to be framed for presentation to the user.

Referring now to FIG. 17, there is illustrated a conversion circuit of the wedge interface. A microcontroller 1700 provides conversion of the data from the input device 1600 and controls interfacing of the keyboard 1610 and input device 1600 with the PC 302. The microcontroller 1700 has contained therein a memory 1702 or it can have external memory. There are provided a plurality of input device interfaces 1704 to the input device 1600, a plurality of PC interfaces 1706 to the PC 302, and plurality of keyboard interfaces 1708 to the keyboard 1610. In general, the input device interfaces 1704 comprise a serial data line, a ground line, and a power line. Similarly, the keyboard interfaces 1708 comprise a serial data line, a ground line, a clock line, and a power line. The PC 302 provides a clock line, a power line, a serial data, and a ground line for input to the microcontroller 1700. The microcontroller 1700 is operable to receive signals from the keyboard 1610 and transfer the signals to the PC 302 as keyboard signals. Operation with the keyboard 1610 is essentially a "passthrough" procedure. Data output from the keyboard 1610 is already in keyboard format, and therefore requires no conversion by the wedge interface 1608. With respect to the input device 1600, the serial data is not compatible with a keyboard 1610 and, therefore, it must be converted into a keyboard format in order to allow input thereof to the keyboard input of the PC 302.

The microcontroller 1700 performs this function after decoding this bar code information, and conversion of this bar code information into an appropriate stream of data which is comprised of the bar code information and the appended URL. This appended URL will be pre-stored in the memory 1702 and is programmable at the time of manufacture. It is noted that the memory 1702 is illustrated as being contained within the microcontroller 1702 to provide a single chip solution. However, this could be external memory that is accessible by the microcontroller 1702. Therefore, the microcontroller 1700 provides an interface between the input device 1600 and the keyboard 1610 to the PC 302 which allows the input device 1600 to receive coded information and convert it to keyboard strokes or, alternatively, to merely pass-through the keystrokes from the keyboard 1610. Therefore, the user need not install any type of plug-in circuit board into the motherboard of the PC 302 in order to provide an interface to the input device 1600; rather, the user need only utilize the already available keyboard port in order to input the appropriate data into the system.

In this particular disclosed embodiment, the microcontroller 1700 comprises a PIC16C73 microcontroller by Microchip Technologies™. The PIC16C73 device is a low cost CMOS 8-bit microcontroller with an integrated analog-to-digital converter. The PIC16C73 device, as illustrated in the disclosed embodiment, has 192 bytes of RAM and 4k×4 of EPROM memory. The microcontroller 1700 can accommodate asynchronous or synchronous inputs from input devices connected to it. In this disclosed embodiment, communication to the keyboard 1610 is synchronous while it is asynchronous when communicating with input device 1600.

It should be noted that, although in this particular embodiment bar code information of the bar code 1606 is input into the keyboard input port of the PC 302, disclosed methods may also be advantageously utilized with high speed port architectures such as Universal Serial Bus ("USB") and IEEE 1394.

Bar codes are structured to be read in either direction. Timing considerations need to be addressed because of the variety of individuals scanning the bar code introduce a wide variety of scan rates. Bar codes use bars of varying widths. The presence of a black bar generates a positive pulse, and the absence of a black bar generates no pulse. Each character of a conventional bar code has associated therewith seven pulses or bars. Depending on the width of the bars, the time between pulses varies. In this disclosed embodiment, the interface circuitry 1608 performs a "running" calculation of the scan time based upon the rising edge of the pulses commencing with the leader or header information. The minimum and maximum scans times are calculated continuously in software with the interface 1608 during the scanning process to ensure a successful scan by the user.

Referring now to FIG. 18, there is illustrated a sample message packet transmitted from the user's PC 302 to the ARS 308. The message packet 1800 comprises a number of bits of information including the bar code information 1802 obtained from the user scanning the bar code 1606 with the input device 1600; the input device ID 1804 which is embedded in a memory in the input device 1600 and identifies it with a particular input device distributor; and a user ID 1806 which is derived from the software running on the PC 302 and which identifies uniquely with the user location. Note that the message packet includes other necessary information for the proper transmission for point to point.

Figure 19:
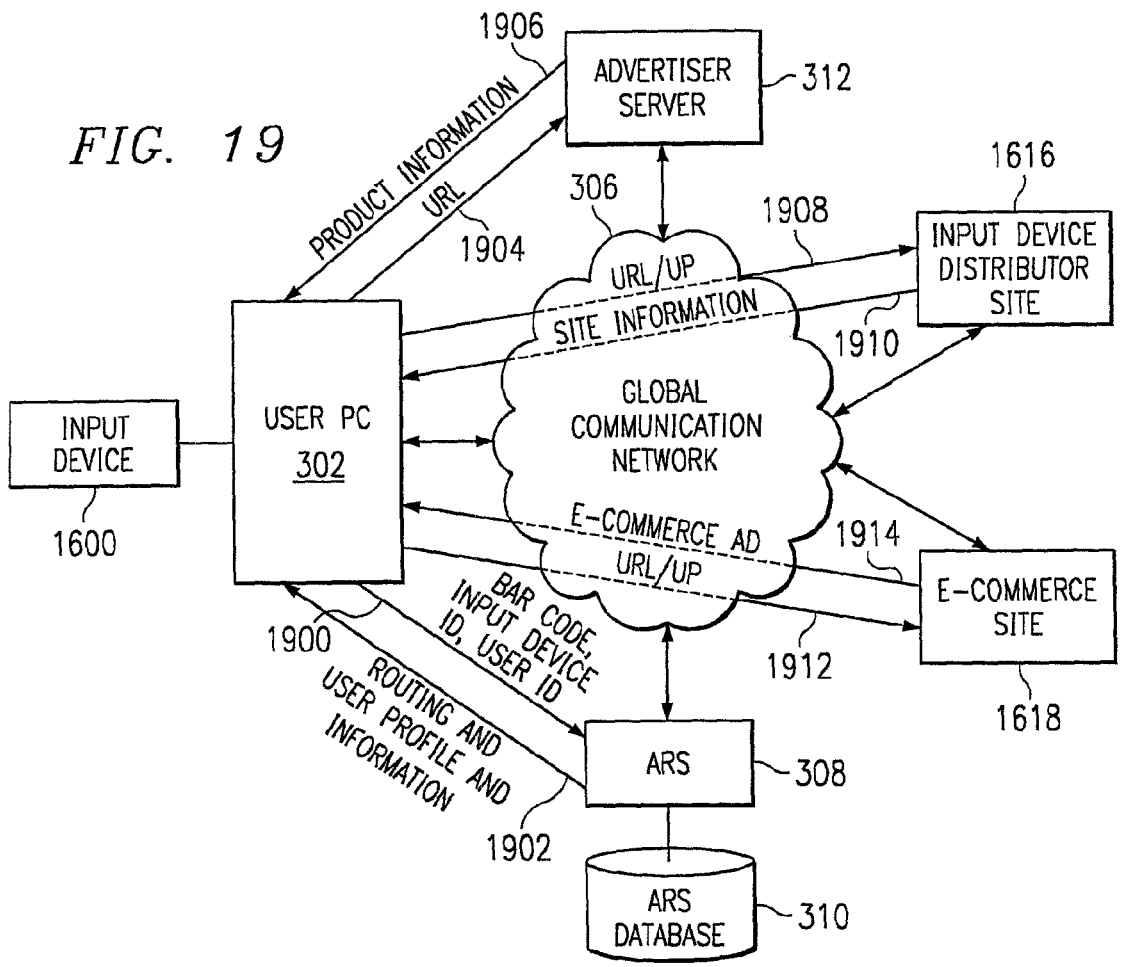
FIG. 19 illustrates a more detailed block diagram of the routing of the message packets between the various nodes.

Referring now to FIG. 19, there is illustrated a more detailed block diagram of the routing of the message packets in order to present the framed information to the user. As is mentioned hereinabove, when the user scans a bar code 1606 using the input device 1600, an input device program running on the user PC 302 is operable to interpret the information output by the input device 1600 and generate a message packet for transmission over the GCN 306. The input device program assembles the message packet such that it is directed to the ARS 308 disposed on the GCN 306. The message packet contains several pieces of information including the input device ID 1804 which links it to the input device distributor, the user ID 1806 which identifies the particular user using the input device 1600, and bar code information 1802 describing a particular product of interest to the user. This message from the PC 302 is transmitted over a path 1900 to the ARS 308 where the ARS database 310 is accessed to cross reference the ID information 1804 and bar code information 1802 to a particular advertiser and input device distributor. The ARS 308 returns a message packet over a path 1902 to the user PC 302 which contains routing information as to the location of various other sites disposed on the GCN 306, for example, the advertiser server 312 and input device distributor site 1616.

It can be appreciated that other information can also be provided by the ARS 308 which more closely targets the particular user of the input device 1600. For example, if it is known that a particular input device 1600 is sold in a certain geographic area, this information can be useful in targeting the particular user with certain advertising information relevant to that geographic area. In any case, the information returned from the ARS 308 over path 1902 provides enough information for the input device program running on the user PC 302 to identify a number of other sites disposed on the GCN 306. The user PC 302 then processes the return message packet and routes another message packet over a path 1904 to the advertiser server 312. The advertiser server 312 then returns product information of the particular product in which the user was interested back to the user PC 302 over a path 1906. Similarly, the user PC 302 routes information (e.g., the URL of the input device distributor site and the user profile) to the input device distributor site 1616 over a path 1908 in order to obtain information back over a path 1910 for framing any banners which identify the input device distributor. Additionally, the user PC 302 forwards a message packet to the E-commerce site 1618 over a path 1912 in order to return information regarding any particular advertisements the input device distributor wants to display to the user. The advertisements are returned to the PC 302 over a path 1914.

Figure 20:
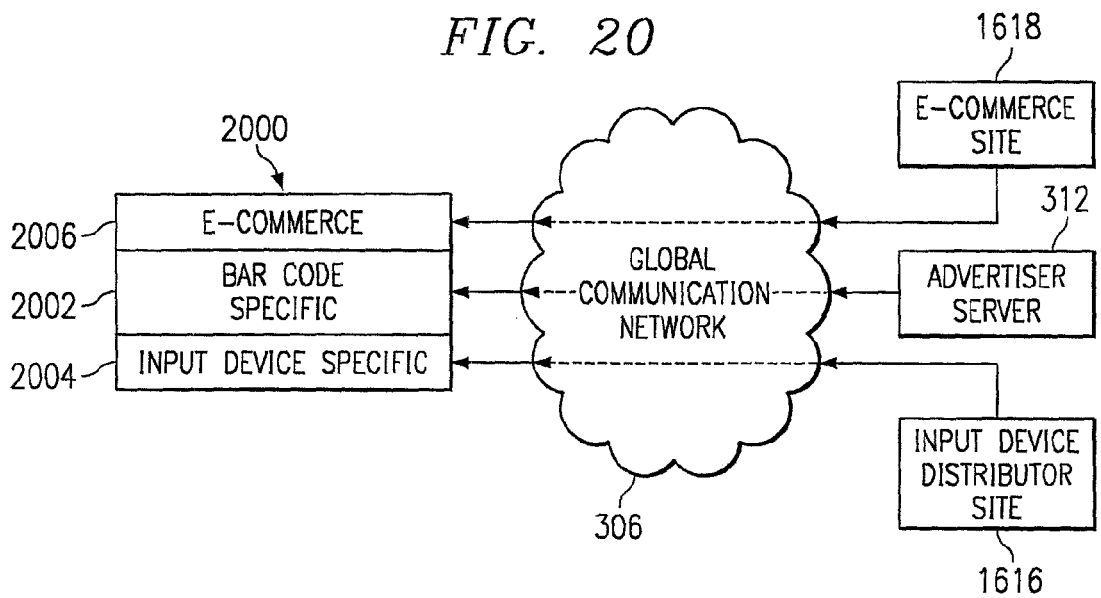
FIG. 20 illustrates a block diagram of a browser window, according to a disclosed embodiment.

Referring now to FIG. 20, there is illustrated a block diagram of a browser window according to the disclosed embodiment. The browser window 2000 is partitioned into a plurality of areas for framing specific information. A bar code area 2002 displays that product information in which the user was interested; an input device-specific area 2004 displays information about the input device distributor; and an E-commerce area 2006 displays advertising information that the input device distributor selects for display according to this particular user and input device 1600. As mentioned hereinabove, a program operable to process scanned bar code information with the unique input device 1600 develops the browser window by partitioning it into specific areas for the framing of information. Therefore, information returned from the E-commerce site 1608 is passed through the GCN 306 to the particular E-commerce frame 2006. Similarly, information about the particular product of interest is returned from the advertiser site 312 across the GCN 306 to the particular bar code specific area 2002. Information placed in the input device specific area 2004 is information about the input device distributor which is returned from the input device distributor site 1616 across GCN 306.

Referring now to FIG. 21, there is illustrated a structure of information contained in the ARS database. The ARS database 310 contains a variety of information required to properly interrogate and assemble packets for obtaining information from the various sites disposed on the GCN 306. The ARS database 310 has a database structure 2100 which contains addresses for the web sites containing the product information requested by the user when scanning the bar code 1606 with the input device 1600. Under a PRODUCT heading 2102 are listed the particular bar codes and associated routing information for addressing the respective server location. For example, the ARS server 308 may contain any number of advertisers having unique URL addresses associated therewith. Therefore, the bar code 1606 of a particular product is associated with a unique URL address which routes any request for information of that product to that particular advertiser's site. Also part of the ARS database structure 2000 is a heading of INPUT DEVICE under which is the input device ID 1804 and the distributor associated with that input device ID 1804.

It can be appreciated that there may be a number of distributors using the disclosed architecture such that each distributor has an ID embedded in the input device 1600 which uniquely identifies that input device with the particular distributor. Therefore, the unique input device ID 1804 needs to be listed with the respective distributors of that input device 1600 in order to process the information that needs to be framed and displayed to that particular user. Another heading under the ARS database structure 2100 is a user heading 2106 which contains profile information associated with that particular user ID 1806. As mentioned hereinabove, the user ID 1806 is obtained via the input device software running on the PC 302 and upon installation or subsequent configuration may request that the user input certain profile information which may be used to target that particular user with products and services which identify with that user profile. The ARS database structure 2100 also contains an E-commerce heading 2108 which contains information related to the bar code 1606 and an advertisement that may be triggered by the request for that information. For example, any bar code 1606 associated with a paper source 1602 can be associated with the specific information in the ARS database 310. A user wishing to obtain information about a specific soft drink may, in fact, trigger an advertising response of a competitor product. Similarly, the user interested in information about that particular soft drink may also trigger information which is relevant to that particular product or a product which may normally be served in conjunction with that soft drink. Furthermore, if the user profile indicates that this individual has significant interest in finance or insurance, the request for information regarding this particular bar coded product may trigger advertisement from an E-commerce server 1618 related to information about finance and insurance. It should be noted that the information described as contained within the ARS database structure 2100 is not limited to what has been described, but may comprise any number of pieces of information used to present desired information to the computer display of the user.

Referring now to FIG. 22, there is illustrated a flowchart of the process of receiving information from the user's perspective, and according to the disclosed embodiment. The input device software running on the user's PC 302 runs in the background until activated by output from the input device 1600. Therefore, flow moves to a decision block 2200 where if a scanned input does not occur, flow moves out the "N" path and loops back to the input of decision block 2200. On the other hand, if scanned input information is received, flow moves out the "Y" path to a function block 2202 where the input device software assembles a message packet containing the bar code information, the input device ID 1804 and the ARS 308 URL address. Additionally, the browser is launched in which this information is placed for transmission to the ARS 308. Flow then moves to a function block 2204 where the browser is partitioned into any number of areas in which information is displayed when obtained from the input device distributor site 1616, the E-commerce site 1618, and the advertiser server 312. It should be known that although three frames are shown in the particular window 2000 of this embodiment, the number of frames displayed in the window 2000 is limited only by the available real estate of the window 2000 area itself.

After the input device software partitions the browser window into one or more frames in preparation of receipt of return information, flow moves to a decision block 2206 where the computer waits for information to be returned from the various sites disposed on the GCN 306. If information is not returned, flow moves out the "N" path and simply loops back to the input to continue monitoring for receipt of the information. If information has been received, flow moves out the "Y" path to a function block 2208 where routing information for each frame (or partitioned area of the window 2000) is inserted into one or more packets for transmission to the various sites. The various sites then return the requested information back to the PC 302, as indicated in function block 2210. Flow is then to a function block 2212 where the proprietary software working in conjunction with the hosted browser places the returned information into the respective frames of the window. The user, viewing the display at PC 302, then perceives a variety of information, one of which is the particular product information which he or she requested, in addition to input device distributor information, and possibly other advertisements based upon the user's profile.

Referring now to FIG. 23, there is illustrated a flowchart of the process according to the ARS. The ARS 308 is operable to decode and process messages received from the GCN 306. Therefore, flow is to a decision block 2300 where, if bar code information is not received, flow is out the "N" path with loop-back to its input. If bar code information has been received, flow is to a function block 2302 where a matching process occurs to link the bar-coded product information to its respective manufacturer. The ARS database 310 also associates the URL address of the manufacturer's server. When a match is found, the ARS 308 begins to assemble a message packet of information for transmission back to the PC 302, as indicated in function block 2304. The message packet contains the product information and the URL address of the manufacturer's website. Flow then moves to a decision block 2306 where the input device ID 1804 is compared with the list of input device IDs issued by the particular input device distributor. If the input device ID 1804 is validated, flow moves out the "Y" path to a function block 2308 where the message packet is appended with the input device ID 1804 and distributor routing address. Flow then moves to a decision block 2310 where the ARS 308 determines if any E-commerce information is to be associated with a particular input device ID 1804. If so, flow is out the "Y" path to a function block 2312 where the message packet is appended with the E-commerce routing string. The E-commerce routing string provides addressing for the E-commerce server 1618. Flow then moves to a function block 2314 where all message packets are returned back to the PC 302 for processing.

Referring back to decision block 2306, if the input device ID 1804 is determined to be invalid, flow moves out the "N" path and jumps forward to the input of decision block 2314, since the lack of a input device ID 1804 interrupts the link to any advertising provided by the E-commerce server 1618. At this point, the only information provided is the link to the advertiser server 312 for return of product information. Referring now to decision block 2310, if no E-commerce information is available, flow moves out the "N" path and jumps forward to the input of function block 2314 where the message packet back to the PC 302 contains only the URL of the advertiser server 312, the bar code information, the distributor server 1616 address and input device ID 1804 information.

Figure 24:
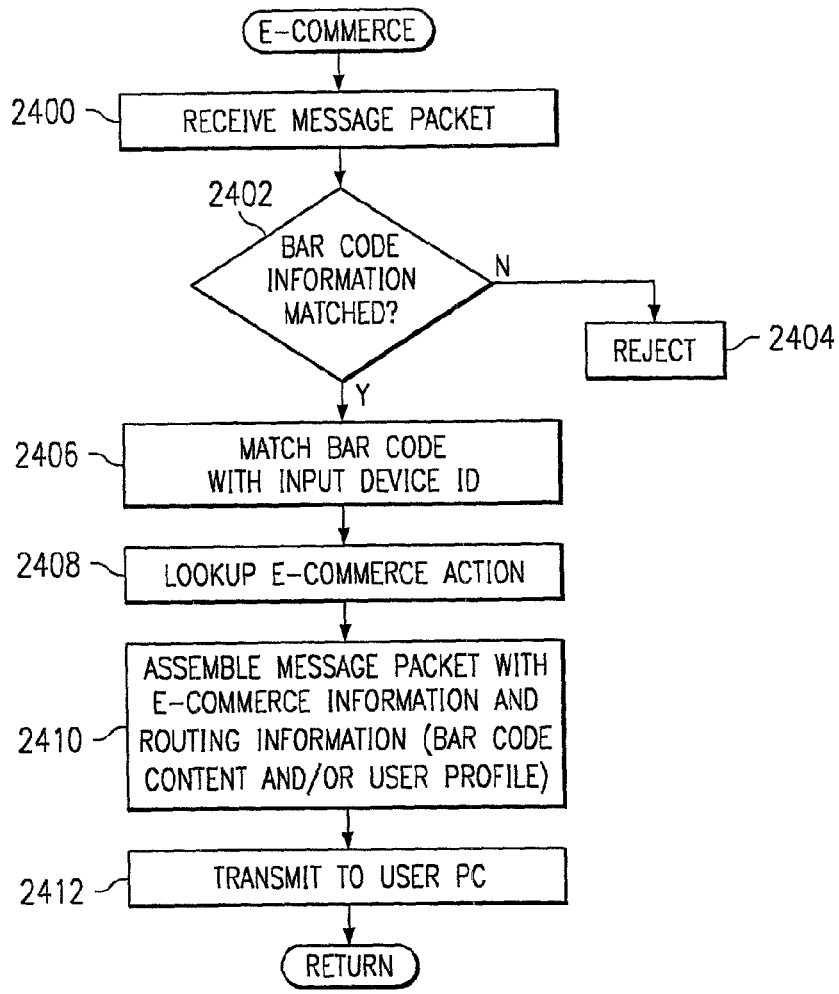
FIG. 24 illustrates a flowchart of the process performed at the E-commerce node.

Referring now to FIG. 24, there is illustrated a flowchart of the process performed at the E-commerce site. The E-commerce server 1618 receives the message packet from the user PC 302, as indicated in function block 2400, and decodes the packet to perform a match with the bar coded information. Moving on to a decision block 2402, if the match is unsuccessful, flow is out the "N" path to a function block 2404 where the match is rejected. A message may be returned to indicate that a problem occurred and the user may need to re-scan the product bar code 1606. If a successful match occurs, flow moves out the "Y" path to a function block 2406 where the input device ID 1804 is matched with the bar code product information. The bar coded information may be distributed to customers over a large geographic area. However, the input device 1606 may be coded for certain geographic areas. For example, an input device 1600 having an XXX ID may be restricted for sale in the Southwestern United States while a input device 1600 having a YYY ID may be sold only in the Northeast. In this way, geographic areas may be targeted with advertising more appealing to that particular area. Advertising returned to the user PC 302 may be focused further by obtaining a user profile when the software or input device 1600 are installed. In this way, advertising may be focused based upon the user profile. Therefore, flow moves to a function block 2408 to lookup the E-commerce action based upon the input device ID 1804 and the bar code information. Flow moves to a function block 2410 to assemble all the information into a packet for return to the user PC 302. The product information and/or user profile information may be returned. Flow is then to a function block 2412 where the message packet is transmitted.

Although it has heretofore been typical for users accessing computer networks such as the Internet to use personal computers (PCS) having a hard-wired network connection, an ever increasing number of users are connecting with various types of wireless devices. Such wireless devices include handheld computers (also known as personal digital assistants ("PDAs")) having integrated wireless Internet access, e.g., the Palm VIIx produced by Palm Inc., cellular telephones having integrated Internet access capabilities, e.g., telephones conforming to the Wireless Application Protocol (WAP) established by the Wireless Application Protocol Forum Ltd., two-way digital pagers and other commercially available devices. All of these wireless devices includes a processor and a transmitter/receiver for sending and receiving radio frequency (RF) signals to provide two-way digital communication between the device's processor and a computer network. Of course, numerous additional components, e.g., memories, displays and input devices, are present in these wireless devices, their specific nature depending upon the type of device and desired features. The general construction of such wireless devices is, however, conventional and thus will not be described in detail.

Figure 25:
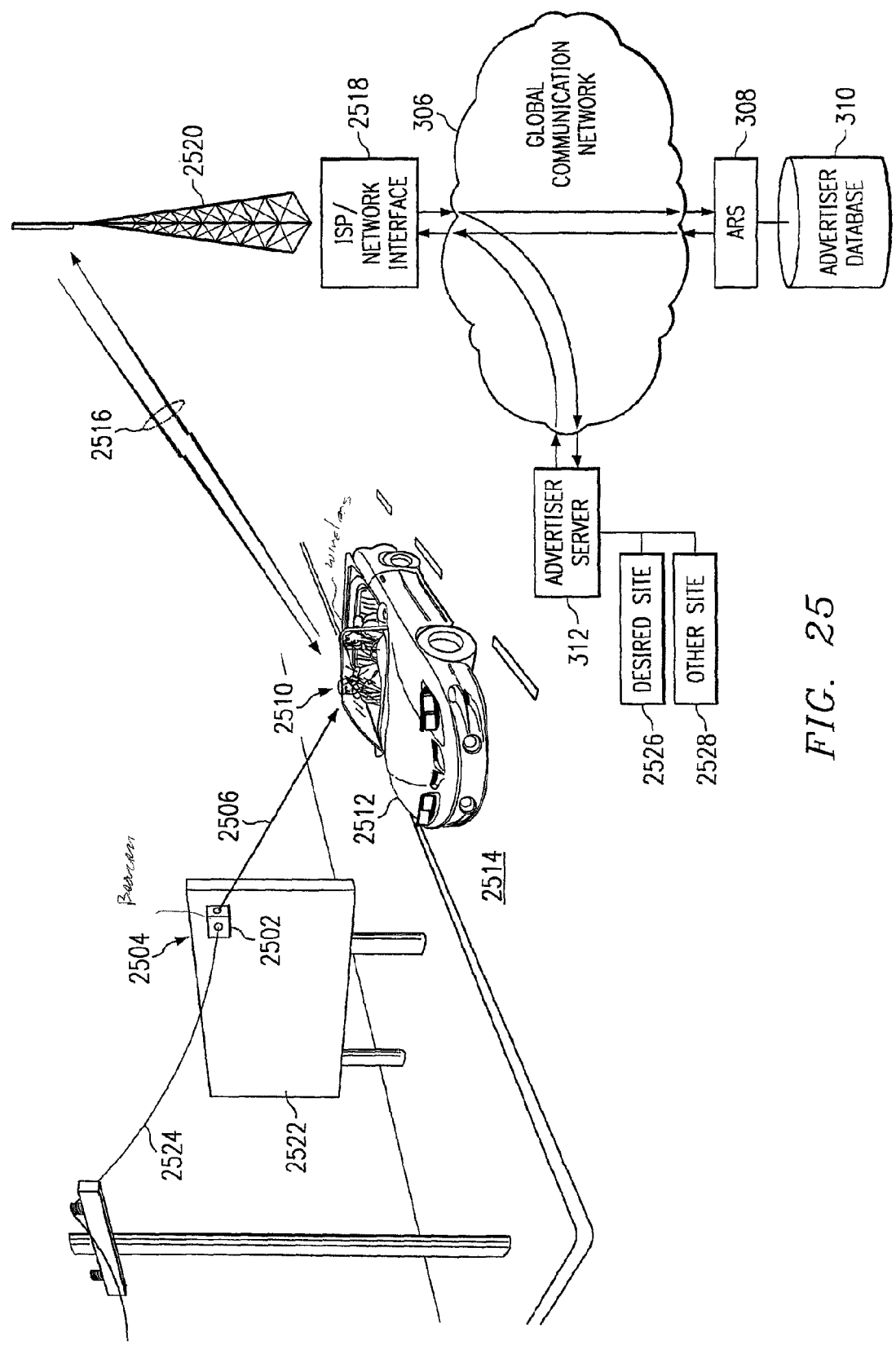
FIG. 25 illustrates a diagrammatic view of a system for connecting a wireless device to a remote location on a network in accordance with another embodiment.

Referring now to FIG. 25, there is illustrated a diagrammatic view of one embodiment of a system for connecting a wireless device to a remote location on a computer network. The system includes a beacon unit 2502 disposed at a geographic location 2504 and transmitting a beacon signal (denoted by arrow 2506) into a target region adjacent to the beacon location. The system also includes a beacon signal receiver circuit (hereafter "BSRC") 2508 disposed with a wireless device 2510 and operably connected to the processor of the wireless device. Upon receiving the beacon signal 2506, the BSRC 2508 sends control signals to the processor of the wireless device 2510. The processor of the wireless device 2510, in response to receiving these control signals, instructs the wireless device to connect to a specific remote location on a computer network. This connection can be completely automatic or it can be made at the option of the user, but in any case it obviates the need for the user to manually input a network address for the remote location.

In the embodiment illustrated, the beacon unit 2502 is mounted on an outdoor advertising structure (i.e., a billboard) 2522 located adjacent to a roadway 2514. The wireless device 2510 is disposed within an automobile 2512 traveling along the roadway 2514. As previously described, the wireless device 2510 includes a processor and a transmitter/receiver for sending and receiving RF signals (denoted by arrows 2516). The RF signals 2516 provide two-way digital communications with a computer network, in this case GCN 306, which may be the Internet. The RF signals 2516 allow communication between the processor of the wireless device 2510 and the computer network 306 through a wireless network interface 2518, which in this case also serves as an Internet service provider (ISP). For purposes of illustration, the network interface 2518 in FIG. 25 shows only one antenna 2520; however, it will be appreciated that the typical wireless network interface comprises a plurality of antennas 2520 and associated radio equipment (not shown) which are distributed across the service area (e.g., in cells) and operably interconnected allowing the wireless device 2510 to maintain virtually unbroken communications with the network 306 as it moves within the service area. It is noted that these wireless devices operate on a delay, such that a request for information may be buffered at the wireless device 2510 in the event of a communication interruption. When communications are resumed, then the request is sent. In the same way, reply information is buffered, such that there may be a delay in returning the information. This is easily facilitated at the ISP 2518, due to the nature of the packet nature of the information transferred. For example, a packet of request information may be buffered at the wireless device 2510 until communication is resumed, and then transmitted to the ISP 2518. Upon receipt, the ISP 2518 acknowledges to the wireless device 2510 that the information has been received. The ISP 2518 then handles the request outside of the wireless connection over link 2520. When connection is established with the advertiser server 312 and information retrieved, this information is buffered at the ISP 2518 and delivered to the wireless device 2510 when communications permit. Since the primary communication protocol is packet-based in nature, this type of buffering is easily facilitated.

Figure 26:
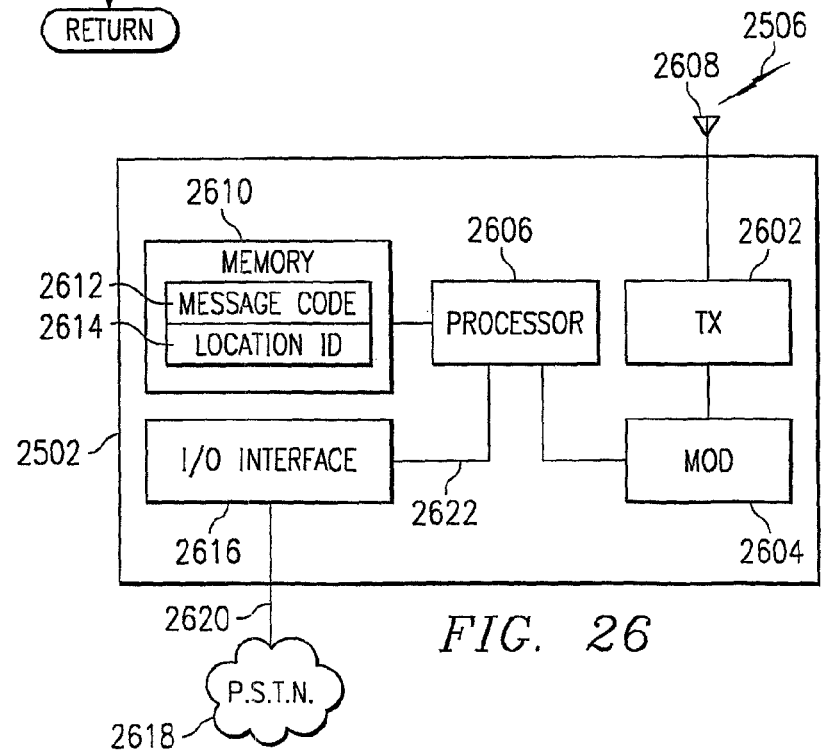
FIG. 26 illustrates a diagrammatic view of one embodiment of a beacon unit.

Referring now to FIG. 26, there is illustrated a diagrammatic view of the beacon unit 2502 of this embodiment. The beacon unit 2502 includes a transmitter 2602, a modulator 2604 operably connected to the transmitter, and a processor 2606 which is operably connected to the modulator. The transmitter 2602 transmits the beacon signal 2506 into the target region. The information content (i.e., modulation) of the beacon signal 2506 is supplied to the transmitter 2602 by the modulator unit 2604, which in turn receives the content from the processor 2606. The beacon signal 2506 may be modulated to carry information content in either digital or analog form. In the illustrated embodiment, the transmitter 2602 is a radio frequency (RF) unit for transmitting an RF beacon signal 2506. An antenna 2608 is operably connected to the transmitter 2602 to provide desired signal radiation strength and directional properties, thereby controlling the size and shape of the target region. Using an omnidirectional antenna 2608 will result in a generally circular target region which surrounds the location of the beacon unit 2502. Using a directional antenna 2608 will result in a narrower, more focused target region, typically to one side of the beacon unit 2502. It will be appreciated that the frequency of the RF beacon signal 2506 will be different from the frequency used by the wireless device 2510 for network communication signals 2516, thereby allowing the signals to operate simultaneously without causing interference.

While the illustrated embodiment uses an RF transmitter 2602 for producing an RF beacon signal 2506, it will be readily apparent that other types of transmitters may be used in alternative embodiments to produce beacon signals having different characteristics. For example, the beacon unit may have an optical transmitter for transmitting an optical beacon signal. An optical beacon signal 2506 may have a carrier wavelength in the visible light portion, the infrared (IR) portion, or the ultraviolet (UV) portion of the electromagnetic spectrum. Such optical beacon signals may be produced using either non-coherent or coherent (e.g., laser) light sources. Optical beacon signals 2506 will typically require a line-of-sight path between the beacon 2502 and the BSRC 2508, however, this may be desirable for certain applications. Further, it avoids RF interference and licensing problems. In yet other embodiments, the beacon unit 2502 may have an acoustic transmitter for transmitting an acoustic beacon signal. The acoustic beacon signal 2506 may have a carrier wavelength in the human-perceptible frequency range or within the ultrasonic frequency range. Acoustic beacon signals 2506 will typically be of short range, but a line-of-sight path is not required.

In the embodiment shown in FIG. 26, an electronic memory device 2610 is operably connected to the processor 2606. This could be conventional DRAM, flash DRAM or SRAM. Magnetic storage could also be utilized. The memory device 2610 includes one or more memory locations which store data, also known as "codes," that can be retrieved by the processor 2606. The processor 2606 sends signals indicative of the retrieved codes to the modulator 2604 for incorporated as a component of the beacon signal 2506 transmitted by the transmitter 2602.

In the illustrated embodiment, two memory locations are provided in the memory device 2610, a first memory location 2612 and a second memory location 2614. Each memory location contains a different code. For example, the first code (denoted "MSG. CODE") in the first memory location 2612 may be associated with a specific remote location on the network 306 to facilitate the connection of the wireless device receiving the code to that specific remote location. However, this association may have one of several forms. In one embodiment, the first code 2612 actually includes routing information (e.g., a URL or other network address) associated with a specific remote location on the network. In other words, the routing information is actually "embedded" or "encoded" in the first code 2612. In an alternative embodiment, the first code 2612 does not actually include routing information to the remote location, but rather is associated with the remote location by other means. This may be by association of the first code 2612 and the remote location in a secondary database such as the advertiser server 312 as further described below.

The second code (denoted in this example by "LOC. ID") in the second memory location 2614 is also transmitted by the transmitter 2602 as a component of the beacon signal 2506. The second code may be associated with an attribute of the beacon unit 2502. Examples of such attributes are the geographic location (i.e., LOC ID) of the beacon unit, a serial number of the beacon unit and/or a type descriptor characterizing the type of beacon unit. Each of these attributes can be used to facilitate the connection of the wireless device 2510 receiving the code to the most appropriate specific remote location on the network 306. In some embodiments, the selection of remote location for connection of the wireless device 2510 may be made by considering both the first code 2612 and the second code 2614. Thus, for example, if the first code "MSG CODE" was associated with a particular restaurant chain (e.g., "Burger X"), and the second code "LOC. ID" was associated with the geographic location of the beacon unit, then the invention could be used to connect the wireless device 2510 to a remote location on the network 306 having information as to the geographic location of the nearest Burger X restaurant (relative to the beacon unit location). Alternately, where the selection of remote location is controlled only by the first code, then the second code can be used to collect information regarding the source of the connection, e.g., to determine the "ratings" (i.e., advertising effectiveness) of a particular beacon unit 2502.

It will be apparent that the association between the second code and the beacon unit attribute may have one of several forms, similar to those previously described for the first code. Thus, the second code may actually include the attribute, e.g., location, serial number or type descriptor, of the beacon unit embedded therewithin. Alternatively, the second code may be associated with the beacon unit attribute in a secondary database such as the ARS 308. Further, it will be apparent that some embodiments may include only one code, in which case the first code may be associated with any of the beacon unit attributes (e.g., location, serial number or type descriptor) as previously discussed.

An input/output ("I/O") interface circuit 2616 may be included in the beacon unit 2502 to allow the memory unit 2610 to be reprogrammed with new codes. The I/O circuit 2616 is operably connected between the processor 2606 and an external instruction source 2618. The I/O circuit 2616 is thus operably connected to the memory unit 2610. Specifically, the I/O circuit 2616 receives instruction signals (denoted by reference number 2620) from the external instruction source 2618 and transforms them into system instruction signals (denoted by reference number 2622) usable by the processor 2606. In response to receipt of the system instruction signals 2622, the processor 2606 accesses the memory unit 2610 and changes the codes in memory locations, e.g., locations 2612 and 2614. In this way, the beacon unit 2502 can be updated to change the remote location to which it directs nearby wireless devices. It will be apparent that a variety of external instruction sources may be utilized. In the illustrated embodiment, the instruction source 2618 is a public switched telephone network ("PSTN") connected to the beacon unit 2502 by telephone lines 2524 (see FIG. 25). In such a case, the I/O circuit 2616 will include a telephone modem circuit allowing the beacon unit 2502 to be updated from a remote location. In another embodiment, the instruction source 2618 may be a keypad or keyboard attached directly to the I/O circuit 2616. In this case, no telephone lines are required, however, service personnel would need to visit the beacon unit 2502 to update the programming. In yet another embodiment, the instruction source 2618 may be an RF receiver circuit, an optical receiver circuit, or an acoustic receiver circuit. In such cases, the beacon unit 2502 may be updated by transmitting instructions on RF, optical or acoustic signals having a frequency appropriate for the respective receiver circuit.

Figure 27:
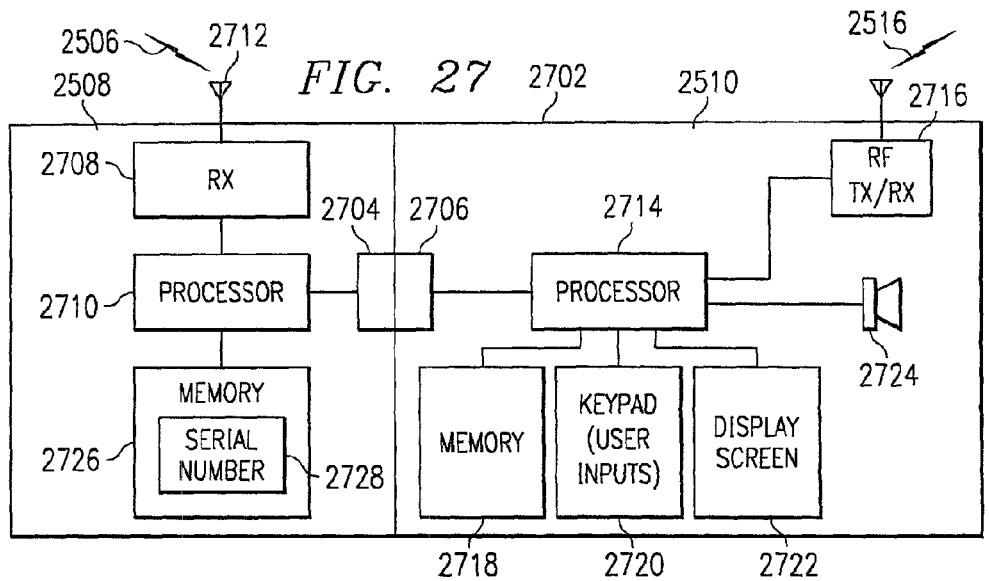
FIG. 27 illustrates a diagrammatic view of one embodiment of a beacon signal receiver circuit and the associated wireless device.
Figure 28A:
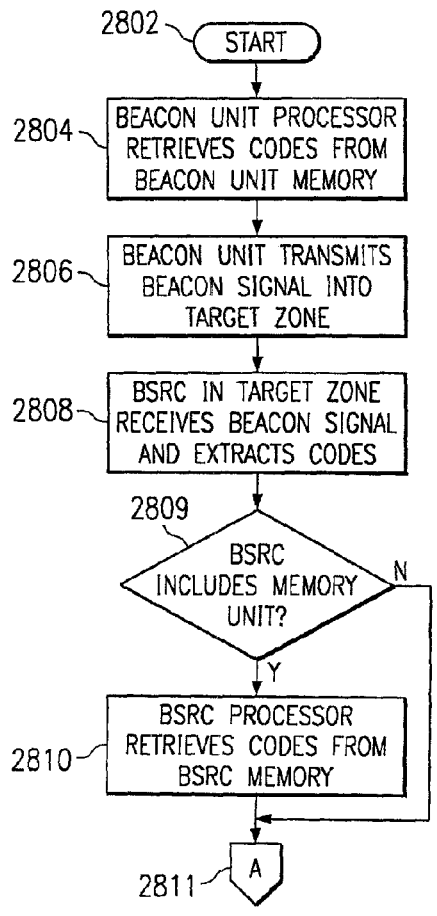
FIGS. 28a-28d illustrate a flowchart of a process for connecting a wireless device to a remote location on a computer network in accordance with another embodiment.
Figure 28B:
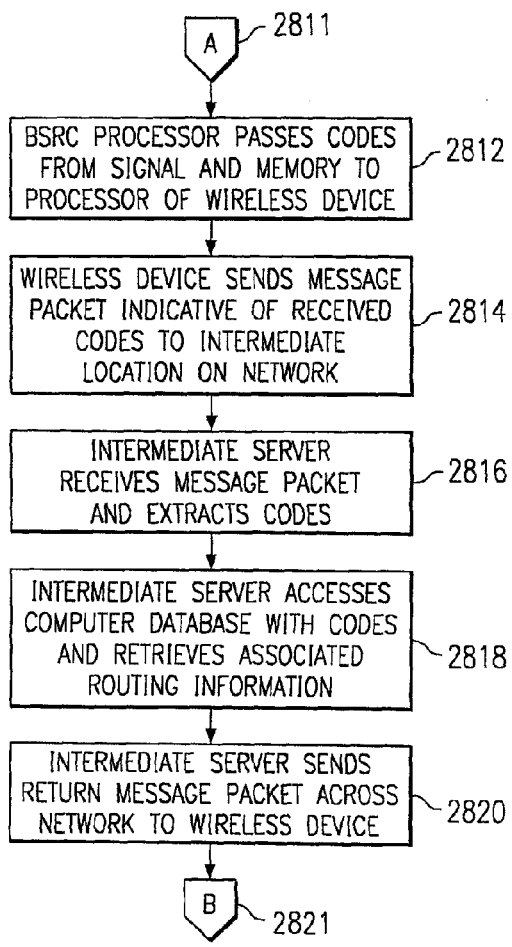
Figure 28C:
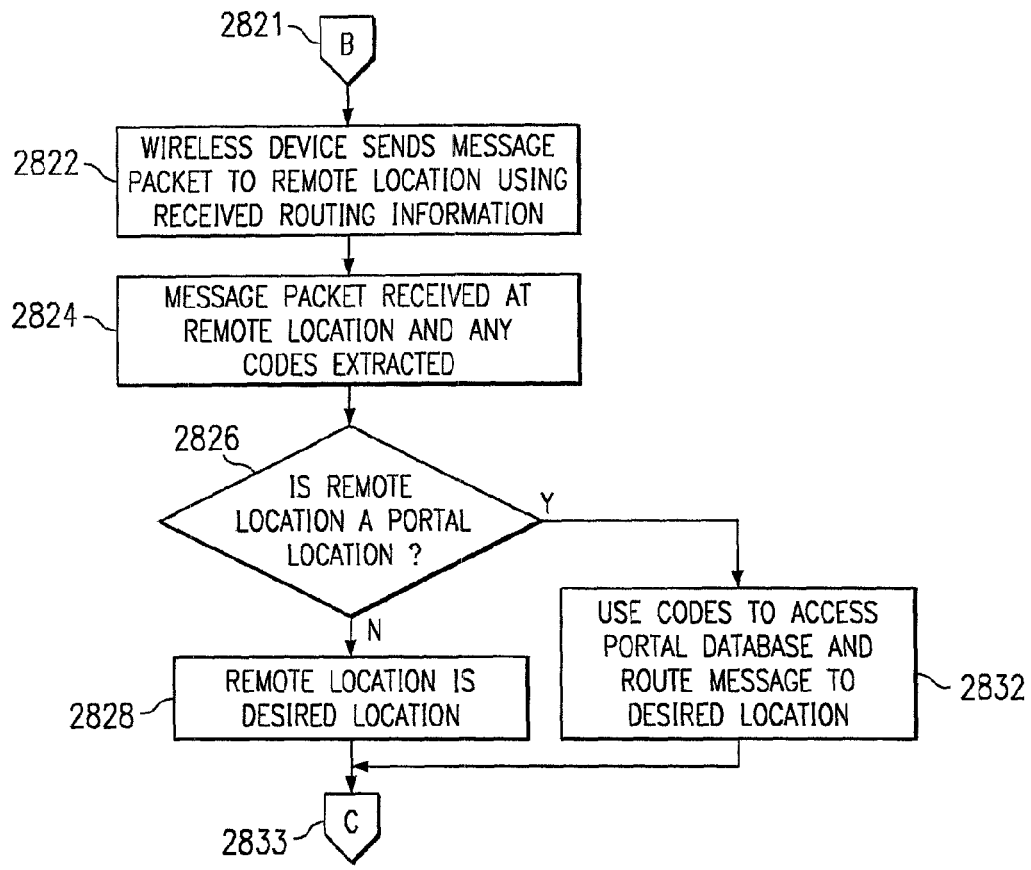
Figure 28D:
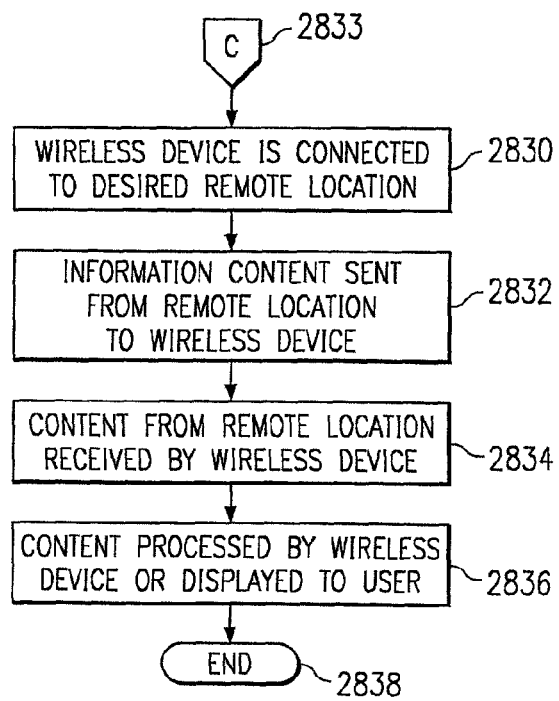

Referring now to FIG. 27, there is illustrated a diagrammatic view of the beacon signal receiver circuit (i.e., "BSRC") 2508 of this embodiment and the associated wireless device 2510. As previously described, the BSRC 2508 is disposed with the wireless device 2510. In the illustrated embodiment, the BSRC 2508 has the form of an add-on module which is attached to the exterior shell 2702 of the wireless device 2510. The two devices pass electronic signals through an electrical interface comprising cooperating electrical connectors 2704 and 2706 located on the BSRC 2508 and wireless device 2510, respectively. In alternative embodiments, however, the BSRC 2508 may be supplied as an integral part of the wireless device 2510, and located entirely within its exterior shell 2702. In such case, the interface between the BSRC 2508 and the wireless device 2510 would be an integral part of the overall device, and the discrete connectors 2704 and 2706 would be unnecessary.

The BSRC 2508 includes a receiver unit 2708 and a processor 2710. The receiver unit 2708 is adapted to receive the beacon signal 2506 transmitted by the beacon unit 2502. In the illustrated embodiment, the receiver unit 2708 is an RF receiver adapted to receive signals from the RF transmitter 2602, and thus is provided with an antenna 2712 to improve reception. In other embodiments, however, the receiver unit 2708 may be an optical receiver or an acoustic receiver to correspond to the type of transmitter used by the beacon unit 2502. In still other embodiments, the BSRC 2508 may include multiple receiver units of different types (e.g., an RF unit and an optical unit) or operating at different wavelengths. The beacon signal 2506 received by the receiver unit 2708 is then demodulated as necessary to extract the information content, e.g., the codes transmitted from the beacon unit memories 2612 and/or 2614. Signals indicative of the received codes (or other information content) are then passed to the BSRC processor 2710. In response to receiving the signals indicative of the received codes, the BSRC processor 2710 sends control signals across the interface 2704, 2706 to the processor 2714 of the wireless device 2510.

As previously discussed, the wireless device 2510 includes a processor 2714 operably connected to an RF transmitter/receiver unit 2716. The RF transmitter/receiver unit 2716 transmits and receives RF signals 2516 to provide two-way communication between the wireless device 2510 and the computer network 306. The wireless device 2510 may further include various types of a memory unit 2718, a keypad, keyboard, touch pad or other user input device 2720, a display screen 2722, and an audio input/output device 2724 (e.g., speaker and/or microphone), depending on its exact type, i.e., whether it is a Internet-ready telephone, an Internet connected personal digital assistant or some other type of network wireless device. The control signals received by the wireless device processor 2714 from the BSRC processor 2710 cause the wireless device 2510 to send RF signals 2516 to the computer network 306 whereby the wireless device is connected to a specific remote location on the network. These RF signals 2516 may include components indicative of the codes received from the memory 2610 of the beacon unit 2502.

In the embodiment shown in FIG. 27, an electronic memory device 2726 is operably connected to the BSRC processor 2710. The memory device 2626 includes one or more memory locations which store data, i.e., "codes", that can be retrieved by the BSRC processor 2710. The BSRC processor 2710 can send signals indicative of the retrieved code to the wireless device processor 2714, which in turn may incorporate the code as a component of the RF signal 2516 used to connect the wireless device 2510 to the remote site on the computer network 306. Thus, the RF signals 2516 transmitted by the wireless device 2510 may include components indicative of codes, or portions thereof, received from the memory 2610 of the beacon unit 2502 and/or components indicative of codes received from the memory 2726 of the BSRC 2508.

In the illustrated embodiment, one memory location 2728 is provided in the memory device 2726 (denoted "SER. NO."). In this embodiment, the code is associated with a serial number for the individual BSRC 2508. This is typically non-volatile memory. This serial number can be provided to the remote location to which the wireless device 2510 is connected to allow tracking of inquiries or the collection of data regarding the effectiveness of the system. In another embodiment, the code may be associated with a type descriptor characterizing the type of BSRC 2508. This type descriptor, when transmitted to the advertiser server 312, may allow selection of a remote location on the network having content which is optimized for display on the particular type of BSRC being connected. In other embodiments, the code located in the memory location 2728 may be associated with the address of a remote location on the network 306, for example the location of the advertiser server 312.

Once the wireless device 2510 has received the codes from the beacon unit 2502 and the BSRC 2508, the connection of the wireless device to a remote location on the computer network 306 may be accomplished generally as described for previous embodiments receiving codes from external devices, e.g., from bar code readers, audio tones embedded in broadcasts or recorded media. For example, as illustrated in FIG. 25, a first computer, e.g., the ARS 308, is disposed on the computer network 306. A computer database, e.g., the advertiser database 310, is operably connected to the first computer 308. The computer database 310 includes a plurality of routing information for remote locations on the computer network and a plurality of first codes (i.e., corresponding to the codes from the beacon unit memory 2612) and associating each of the routing information with at least one of the first codes. Upon receiving a message packet (i.e., a signal containing information components which are indicative of the first code) transmitted from the wireless device 2510 across the network 306, the first computer 308 accesses the computer database 310, retrieves the routing information associated with the particular first code, and transmits the routing information associated with the particular first code across the computer network back to the wireless device. It will be readily apparent that, in some embodiments the routing information in the database 310 may be further associated with a plurality of additional codes (e.g., second code from beacon unit memory 2614 and third code from BSRC memory 2728) to allow for further refining of the selection of routing information to be transmitted back to the wireless device 2510.

In response to receiving the routing information associated with the particular first code (and any additional codes, if applicable, as described above) from the first computer 308, the wireless device 2510 then sends a second message packet across the network to a remote location as directed by the routing information just received. This may be the desired remote location, or alternatively, codes incorporated into the second message packet may be evaluated to select a particular remote location from among a plurality of locations accessible through this site. Once the determination has been made, the wireless device 2510 is connected to the desired remote site on the network 306. In most cases, information content will be returned from the remote site to the wireless device for further evaluation or display to the user.

Referring now to FIGS. 28a-28d, there is illustrated a flowchart of the process for connecting a wireless device to a remote location on a computer network in accordance with another aspect of the invention. The process begins in the "START" block 2802 (FIG. 28a) and then proceeds to function block 2804, wherein the beacon unit processor 2606 retrieves the code or codes from the beacon unit memory 2610. In the illustrated embodiment, a first and second code are retrieved from the beacon unit memory. The process then proceeds to function block 2806, wherein the beacon unit 2502 transmits as a continual and/or repetitive broadcast into the target zone the beacon signal 2506 which incorporates information indicative of the first code and the second code. The process then proceeds to function block 2808, wherein the BSRC 2508 which is within the target zone receives the beacon signal 2506 and extracts the first and second codes. If the BSRC 2508 includes a memory unit 2726 (this test being represented by the decision block 2809), the process then proceeds to function block 2810 where the BSRC processor 2710 retrieves the code or codes from the BSRC memory. If the BSRC 2508 does not include a memory unit, then function block 2810 is omitted. The process then proceeds to function block 2812 (FIG. 28b), wherein the BSRC processor 2710 passes the first, second, and/or third codes (as applicable) to the processor 2714 of the wireless device 2510 for buffering therein.

Once the wireless device 2510 receives the signals indicative of codes from the BSRC 2508, the process then proceeds to function block 2814, wherein the wireless device sends RF signals 2516 having a first message packet which incorporates the codes via the ISP 2518 to a first location on the network 306. In some embodiments, e.g., where the codes from the beacon unit 2502 actually include embedded routing information to the desired remote location, e.g., location 2526 (FIG. 25), the first message packet may be routed directly to the desired remote location on the network 306 using the routing information from the code. In the illustrated embodiment, however, the codes in the RF signals 2516 do not contain embedded routing information relating to the desired remote location. Therefore, it is necessary for the first message packet to be routed to a known intermediate site, e.g., ARS 308, where the codes can be used to retrieve the necessary routing information from a database, e.g., database 310. In such case, the RF signals 2516 will incorporate default routing information necessary to guide the first message packet to the intermediate location. It will be understood however, that this fixed routing information, i.e., to an intermediate location used to obtain further routing information to remote sites, is to be distinguished from the routing information to the desired remote location. The process next proceeds to function block 2816, wherein the intermediate server 308 receives the message packet including the codes received from the beacon unit 2502 and/or BSRC 2508 and extracts the codes. The process then proceeds to function block 2818, wherein the intermediate server 308 accesses the computer database 310 and retrieves the routing information associated with the codes.

After retrieving the routing information associated with the codes received from the beacon unit 2502 and/or BSRC 2508 from the computer database 310, the process continues to function block 2820, wherein the intermediate server 308 sends another message packet including the routing information back across the network 306 to the wireless device 2510. The process then proceeds to function block 2822 (FIG. 28c), wherein the wireless device 2510 sends a second message packet across the network 308 to a remote location using the routing information just retrieved from the intermediate site 308. The second message packet may also include some or all of the codes received from the beacon unit 2502 and/or BSRC 2508. The process then proceeds to function block 2824, wherein the second message packet is received at the remote location specified by the routing information retrieved from the intermediate site 308. As represented by the decision block 2826, in some embodiments, this remote location may be the desired remote location 2526, in which case the process proceeds to function block 2828 and the connection of the wireless device 2510 to a remote location on the network has been completed (as denoted in function block 2830). In the illustrated embodiment, however, this location is a "portal" site, e.g., advertiser server 312, providing access to a plurality of additional remote locations on the network, e.g., content locations designated by reference numbers 2526 and 2528. In this latter case, the process proceeds from decision block 2826 to function block 2832. In the function block 2832, the codes in the second message packet (which originated from the beacon unit 2502 and/or BSRC 2508) are used to access a database or lookup table at the portal location 312 associating each of the plurality of remote locations with one or more of the codes. This process then also proceeds to function block 2830, wherein the associated one of the plurality of remote locations, i.e., the desired location 2526, is connected to the wireless device to complete the basic process.

In the illustrated embodiment, the process is extended beyond the basic process to an additional function block 2832, wherein information content from the remote site 2526 is sent back across the network 306 to the wireless device 2510. The extended process next proceeds to function block 2834, wherein content from the desired remote location is received by the wireless device 2510. The extended process then proceeds to function block 2836, wherein the received content is further processed or displayed by the wireless device 2510 to the user. The extended process then proceeds to the "END" block 2832 indicating that the extended process is complete.

Figure 29:
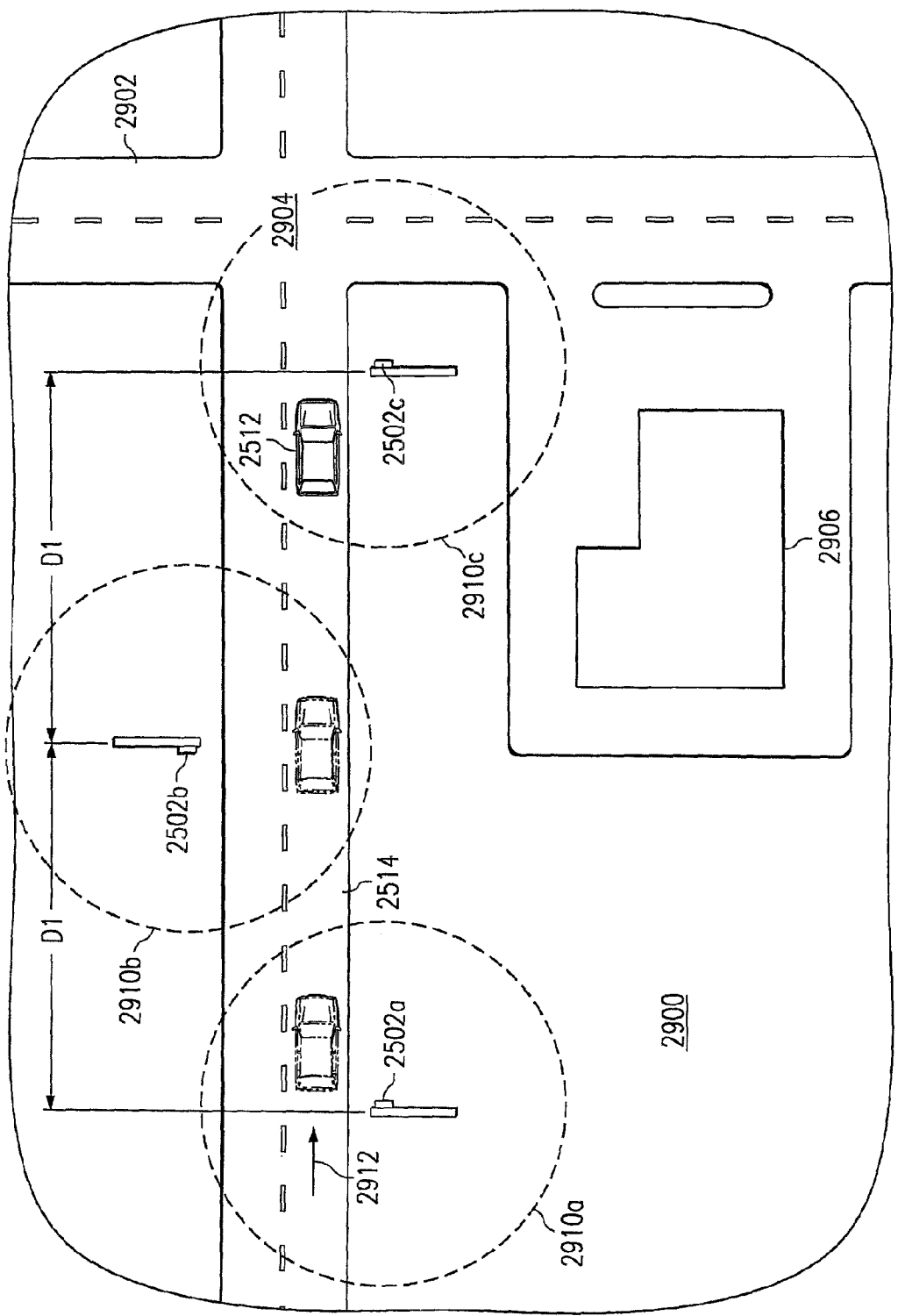
FIG. 29 is a plan view of a geographic region containing an embodiment of the invention.

Referring now to FIG. 29, there is illustrated an aerial view (i.e., plan view) of a geographic region 2900 in which an embodiment of the system has been deployed. The geographic region 2900 includes a first roadway 2514, a second roadway 2902, an intersection 2904 between the two, and a retail establishment 2906 disposed alongside the second roadway. In this embodiment, three beacon units denoted by reference numerals 2502a, 2502b and 2502c, respectively, are positioned along the first roadway 2514. The beacon units may be mounted on antenna towers, billboards, buildings or even smaller structures such as park benches, depending upon the type of beacon and coverage range required. In this example, each of the beacon units 2502a, 2502b and 2502c transmits an RF beacon signal 2506 using an omnidirectional antenna 2604, resulting in circular target regions 2910a, 2910b and 2910c, respectively. In this embodiment, the beacon units 2502a, 2502b and 2502c are spaced apart a distance D1 which is greater than the sum of the radii for adjacent target regions, thus, the target regions 2910a, 2910b and 2910c form "cells" which do not overlap. This arrangement allows adjacent beacon units to broadcast beacon signals on the same frequency without interfering with one another, and it also allows the BSRC 2508 to utilize a single reception frequency. It will be apparent, however, that other embodiments of the invention may employ beacon units transmitting on different and/or multiple frequencies and beacon signal receiver units receiving on different and/or multiple frequencies.

Referring still to FIG. 29, as the automobile 2512 travels along the first roadway 2514 in the direction indicated by arrow 2912, it passes sequentially through the target regions 2910a and 2910b (as indicted by phantom lines) to its current position in target region 2910c. A BSRC 2508 operably connected to a wireless device 2510 in the automobile 2512 will therefore sequentially receive beacon signals from each of the beacon units 2502a, 2502b and 2502c. As previously described, the wireless device 2510 may be connected to a remote site on the network upon receiving each of the beacon signals. For example, the first beacon unit 2502a may cause the wireless device 2510 to connect to a remote location providing geographically relevant information regarding the nearby retail establishment 2906 and indicating that it can be reached by turning at an upcoming intersection. The third beacon unit 2502c, whose target area 2910c covers the intersection 2904, may cause the wireless device 2510 to connect to a remote location also providing geographically relevant information, i.e., that the driver should turn onto roadway 2902 at the current intersection (i.e., intersection 2904) to reach establishment 2906. On the other hand, the second beacon unit 2502b, may cause the wireless device 2510 to connect to a remote location which provides information having no geographical relevance, e.g., information relating to the product advertised on an adjacent billboard.

It will be appreciated that, while all the previously described embodiments utilize a beacon unit 2502 having a fixed geographic location, this is not a requirement of the invention. In other embodiments, the beacon unit 2502 may be mounted on a vehicle, e.g., a bus, a taxi, a truck, a train, an automobile, or even an aircraft, and equipped with a mobile power supply so that it may transmit the beacon signal 2506 as the vehicle moves. The target area of the beacon signal transmission thus moves as the vehicle moves, encompassing various wireless devices whether they are moving or stationary. Those wireless devices equipped with a compatible BSRC 2508 may then be automatically connected to a remote location on a network as previously described.

Although the preferred embodiment has been described in detail, it should be understood that various changes, substitutions and alterations can be made therein without departing from the spirit and scope of the invention as defined by the appended claims.

What is claimed is:

1. A method for connecting a wireless device to a remote location on a computer network, the method comprising the steps of:
    a) transmitting a beacon signal from a beacon unit disposed at a first geographic location, the beacon signal including components indicative of a first code and of a second code, the first code being associated with a remote location on a computer network and the second code being associated with an attribute of the beacon unit;
    b) receiving the beacon signal using a beacon signal receiver circuit disposed in association with a wireless device at a second geographic location, and extracting from the received beacon signal the first code and the second code;
    c) sending, in response to receiving the beacon signal, control signals indicative of the first code and the second code from the beacon signal receiver circuit to the wireless device;
    d) automatically transmitting, in response to receiving the control signals, an RF signal constituting a first message packet from the wireless device to an intermediate location on the computer network, the first message packet being indicative of the first code and the second code;
    e) receiving the first message packet at the intermediate location on the computer network and extracting the first code and the second code therefrom;
    f) accessing a computer database from the intermediate location, the database including a plurality of routing information for remote locations on the computer network and a plurality of first codes and associating each of the routing information with at least one of the first codes, and retrieving the routing information associated with the first code received in the beacon signal;
    g) transmitting a reply packet including the routing information associated with the first code from the intermediate location across the computer network to the wireless device; and
    h) transmitting, in response to receiving the reply packet, a second message packet from the wireless device to a remote location on the network using the received routing information, thereby connecting the wireless device to the associated remote location.

2. A method in accordance with claim 1, wherein the step of transmitting a second message packet from the wireless device to a remote location further comprises the sub-step of transmitting the first code to the remote location.

3. A method in accordance with claim 1, wherein the step of transmitting a second message packet from the wireless device to a remote location further comprises the sub-step of transmitting the second code to the remote location.

4. A method in accordance with claim 1, wherein:
    the computer database further includes a plurality of second codes which are associated with the plurality of routing information for remote locations on the computer network; and
    the step of accessing a computer database from the intermediate location further comprises the sub-steps of:
        a) determining whether more than one of the routing information are associated with the first code received in the beacon signal; and
        b) if so, selecting for retrieval such routing information which is also associated with the second code.

5. A method in accordance with claim 4, wherein the step of transmitting a second message packet from the wireless device to a remote location further comprises the sub-step of transmitting the first code to the remote location.

6. A method in accordance with claim 4, wherein the step of transmitting a second message packet from the wireless device to a remote location further comprises the sub-step of transmitting the second code to the remote location.

7. A method in accordance with claim 1, further comprising the steps of:
    a) retrieving, prior to sending control signals from the beacon signal receiver circuit to the wireless device, a third code from a memory unit of the beacon signal receiver circuit, the third code being associated with an attribute of the beacon signal receiver circuit;
    b) sending, in response to receiving the beacon signal, control signals indicative of the third code from the beacon signal receiver circuit to the wireless device;
    c) transmitting, as a component of the RF signal constituting the first message packet, signals indicative of the third code; and
    d) extracting the third code from the first message packet at the intermediate location.

8. A method in accordance with claim 7, wherein the step of transmitting a second message packet from the wireless device to a remote location further comprises the sub-step of transmitting the third code to the remote location.

9. A method in accordance with claim 7, wherein:
    the computer database further includes a plurality of third codes which are associated with the plurality of routing information for remote locations on the computer network; and
    the step of accessing a computer database from the intermediate location further comprises the sub-steps of:
        a) determining whether more than one of the routing information are associated with the first code received in the beacon signal; and
        b) if so, selecting for retrieval such routing information which is also associated with the third code.

10. A method in accordance with claim 9, wherein:
    the computer database further includes a plurality of second codes which are associated with the plurality of routing information for remote locations on the computer network; and
    the step of accessing a computer database from the intermediate location further comprises the sub-steps of:
        a) determining whether more than one of the routing information are associated with both the first code and the third code received in the beacon signal; and
        b) if so, selecting for retrieval such routing information which is also associated with the second code.

11. A method for connecting a wireless device to a remote sender on a computer network, the wireless device including a processor and a transmitter/receiver for sending and receiving radio frequency signals to provide two-way digital communication between the processor and the computer network, the method comprising the steps of:
    a) transmitting a beacon signal from a beacon unit disposed at a first location, the beacon signal including components indicative of a first code and of a second code, the first code being associated with a remote location on a computer network and the second code being associated with an attribute of the beacon unit;

b) receiving the beacon signal with a beacon signal receiver circuit disposed with the wireless device, the beacon signal receiver circuit being operably connected to the processor of the wireless device;

c) extracting the first code and the second code from the beacon signal using the beacon signal receiver circuit;

d) automatically sending control signals including the first code and the second code from the beacon signal receiver circuit to the processor of the wireless device;

e) transmitting RF signals, in response to receiving the control signals including the first code and the second code from the beacon signal receiver circuit, from the wireless device to the computer network;

f) connecting the wireless device to a remote location on the computer network which is associated with the first code;

g) transmitting a reply packet including the routing information associated with the first code from the intermediate location across the computer network to the wireless device; and h) transmitting, in response to receiving the reply packet, a second message packet from the wireless device to a remote location on the network, using the received routing information, thereby connecting the wireless device to the associated remote location.

12. A method in accordance with claim 11, wherein the beacon signal is a radio frequency (RF) signal.

13. A method in accordance with claim 12, wherein the frequency of the RF beacon signal is different from the frequency used by the RF transmitter/receiver of the wireless device to communicate with the network.

14. A method in accordance with claim 11, wherein the beacon signal is an optical signal.

15. A method in accordance with claim 11, wherein the beacon signal is an acoustic signal.

16. A method in accordance with claim 11, wherein the step of transmitting a beacon signal from the beacon unit further includes the sub-steps of:

a) accessing, prior to transmitting the beacon signal, a beacon unit memory using a beacon unit processor, the beacon unit processor being operably connected to the beacon unit memory;

b) retrieving the first code from a memory location in the beacon unit memory using the beacon unit processor;

c) passing the first code from the beacon unit processor to a modulator constituting a third portion of the beacon unit, the modulator being operably connected to the processor; and d) modulating a carrier signal with the modulator to include modulation indicative of the first code for transmission as a component of the beacon signal.

17. A method in accordance with claim 16, wherein the first code includes routing information embedded therein which is sufficient, of itself, to direct the connection of the wireless device to the desired remote location on the network.

18. A method in accordance with claim 16, wherein the first code does not include routing information embedded therein which is sufficient, of itself, to direct the connection of the wireless device to the desired remote location on the network.

19. A method in accordance with claim 18, wherein the step of connecting the wireless device to a remote location on the computer network further comprises the steps of:

a) sending a first message packet from the wireless device to an intermediate location on the network, the first message packet including information indicative of the first code;

b) receiving the first message packet at the intermediate location and extracting the first code therefrom;

c) accessing a computer database from the intermediate location, the database including a plurality of routing information for remote locations on the computer network and a plurality of first codes and associating each of the routing information with at least one of the first codes, and retrieving the routing information associated with the first code received in the beacon signal;

d) transmitting the routing information associated with the first code from the intermediate location across the computer network to the wireless device; and e) transmitting, in response to receiving the routing information associated with the first code, a second message packet from the wireless device to a different remote location on the network as directed by the routing information just received.

20. A method in accordance with claim 19, further comprising the steps of:

a) receiving the second message packet at the different remote location on the network;

b) sending, in response to receiving the second message packet, information from the different remote location back across the network to the wireless device; and c) receiving with the wireless device the information from the different remote location and displaying the information to a user.

\* \* \* \* \*